United States Patent
Kojima et al.

(10) Patent No.: US 9,103,114 B2
(45) Date of Patent: Aug. 11, 2015

(54) VACUUM HEAT INSULATION MATERIAL AND MANUFACTURING METHOD THEREFOR

(75) Inventors: Shinya Kojima, Kyoto (JP); Fumie Horibata, Shiga (JP); Tomohisa Tenra, Shiga (JP); Toshio Kobayashi, Kyoto (JP)

(73) Assignee: PANASONIC CORPORATION, Osaka (JP)

( * ) Notice: Subject to any disclaimer, the term of this patent is extended or adjusted under 35 U.S.C. 154(b) by 478 days.

(21) Appl. No.: 13/063,048

(22) PCT Filed: Sep. 9, 2009

(86) PCT No.: PCT/JP2009/004454
§ 371 (c)(1),
(2), (4) Date: Mar. 9, 2011

(87) PCT Pub. No.: WO2010/029730
PCT Pub. Date: Mar. 18, 2010

(65) Prior Publication Data
US 2011/0165367 A1    Jul. 7, 2011

(30) Foreign Application Priority Data

Sep. 10, 2008  (JP) ................................. 2008-231737
Aug. 18, 2009  (JP) ................................. 2009-188881

(51) Int. Cl.
*B32B 1/06* (2006.01)
*B32B 3/02* (2006.01)
*B32B 37/12* (2006.01)
(Continued)

(52) U.S. Cl.
CPC ............... *E04B 1/803* (2013.01); *F16L 59/065* (2013.01); *Y02B 80/12* (2013.01); *Y10T 428/231* (2015.01)

(58) Field of Classification Search
None
See application file for complete search history.

(56) References Cited

U.S. PATENT DOCUMENTS 3,788,374 A * 1/1974 Saijo .............................. 604/408
4,455,808 A * 6/1984 Netzhammer ............... 53/371.2
(Continued)

FOREIGN PATENT DOCUMENTS

EP        076966 A1    4/1983
EP        076966 B1    12/1986
(Continued)

OTHER PUBLICATIONS

Oxford Dictionary, "CORRUGATED". Online Oxford Dictionary, U.S. English Definition; <http://www.oxforddictionaries.com/definition/american_english/corrugated>.*
(Continued)

*Primary Examiner* — David Sample
*Assistant Examiner* — Donald M Flores, Jr.
(74) *Attorney, Agent, or Firm* — Brinks Gilson & Lione

(57) ABSTRACT

A plurality of thin-wall parts (9a) of a sealant layer (7) are formed in a portion continuously changed in the interval of one sealing part (8) and a gas barrier layer (6) of other laminate film (4). At the inner circumferential side between the adjacent thin-wall parts (9a) and the thin-wall part (9a) at the innermost circumferential side and at the outer circumferential side of the thin-wall part (9a) of the outermost circumferential side, a thick-wall part (9b) of the sealant layer (7) is formed. All of the opposing sealant layers (7) between the two adjacent thin-wall parts (9a) are mutually heated and fused, so that an excellent adiabatic performance is maintained for a long period.

17 Claims, 5 Drawing Sheets

(51) Int. Cl.
*E04B 1/80* (2006.01)
*F16L 59/065* (2006.01)

(56) References Cited

U.S. PATENT DOCUMENTS

| | | | | |
|---|---|---|---|---|
| 5,246,720 | A | * | 9/1993 | Buchko .................. 426/106 |
| 5,352,043 | A | * | 10/1994 | Takagaki et al. ............ 383/104 |
| 6,594,872 | B2 | * | 7/2003 | Cisek ...................... 24/401 |
| 7,048,125 | B2 | * | 5/2006 | Mize et al. ............... 206/497 |
| 2003/0134078 | A1 | * | 7/2003 | Urata et al. ............... 428/69 |

FOREIGN PATENT DOCUMENTS

| | | |
|---|---|---|
| EP | 1617126 A1 | 1/2006 |
| JP | 62-141190 U | 9/1987 |
| JP | 05-269854 A | 10/1993 |
| JP | 07-269780 A | 10/1995 |
| JP | 08-082474 A | 3/1996 |
| JP | 2000-104889 A | 4/2000 |
| JP | 2003-314786 A | 11/2003 |
| JP | 2007-016927 A | 1/2007 |
| JP | 2008-008431 A | 1/2008 |

OTHER PUBLICATIONS

Oxford Dictionary, "CORRUGATED", Online Oxford Dictionary, U.S. English Definition (No Date); <http://www.oxforddictionaries.com/definition/american_english/corrugated>.*
International Search Report for International Application No. PCT/JP2009/004454, dated Dec. 15, 2009, 2 pages.
Extended European Search Report for European Application No. 09812879.6, dated Dec. 1, 2011, 8 pages.

* cited by examiner

VACUUM HEAT INSULATION MATERIAL AND MANUFACTURING METHOD THEREFOR

This application is a 371 application of PCT/JP2009/004454 having an international filing date of Sep. 9, 2009, which claims priority to JP2008-231737 filed on Sep. 10, 2008 and JP2009-188881 filed on Aug. 18, 2009, the entire contents of which are incorporated herein by reference.

TECHNICAL FIELD

The present invention relates to a vacuum insulation material having a core material sealed at a reduced pressure between two laminate films opposite to each other at the sealant layers, and a method of manufacturing the same.

BACKGROUND ART

Recently, as a countermeasure against global warning to solve the serious problem of the environment of the earth, active movements are promoted to save energy in the electric household appliances, machines and facilities, houses and buildings, and there is a keen demand for vacuum insulation materials having an excellent adiabatic effect for a long period.

A vacuum insulation material includes a core material having fine air gaps such as glass wool or silica powder, being covered with an laminate film having a gas barrier property, and the inside of the laminate film is sealed at a reduced pressure. The vacuum insulation material is capable of expressing a high adiabatic effect by keeping the inside space at a high degree of vacuum, and minimizing the amount of heat transferring through a vapor phase. In order to obtain its excellent adiabatic effect for a longer period, it is extremely important to maintain the high degree of vacuum in the vacuum insulation material.

Among methods of maintaining the degree of vacuum in the vacuum insulation material, generally, a method of sealing a gas adsorbent or a moisture adsorbent, together with a core material, inside the vacuum insulation material at a reduced pressure is known. By this method, the atmospheric gas can be removed from the residual moisture released from the fine air gaps in the core material after vacuum packaging into the vacuum insulation material, or from the steam, oxygen or other gas passing through the laminate film from the atmosphere and infiltrating into the vacuum insulation material at gradual time intervals.

However, considering the adsorbing capacity of the existing adsorbents, it seems insufficient by the use of adsorbents alone in order to present a vacuum insulation material capable of maintaining a high adiabatic effect for a long period, and it is necessary to add any means for suppressing the amount of atmospheric gas infiltrating into the vacuum insulation material.

Let's discuss the route of gas invading from the atmosphere into the vacuum insulation material. In the vacuum insulation material, usually, two rectangular laminate films are laid over, and outer peripheral parts near peripheral edges of three sides of the laminate films are heated and fused, and a three-way seal bag is formed. A core material is inserted into the formed three-way seal bag from its opening part, and the inside of the bag of the laminate films is evacuated by a vacuum packaging machine, and the opening part of the three-way seal bag is heated and fused.

The laminate film usually consists of an innermost layer, which is a sealant layer made of thermal plastic resin such as low-density polyethylene or the like. Its intermediate layer is a gas barrier layer made of a barrier material such as aluminum foil or aluminum deposition film. Its outermost layer is a protective layer playing the role of surface protection, such as nylon film or polyethylene terephthalate film. These layers are adhered together by way of an adhesive agent, and this laminated film is used as a laminate film.

In this case, the atmospheric gas passing into the inside of the vacuum insulation material from the atmosphere is divided into two components, that is, a component passing through pin holes in the aluminum foil or gaps in the deposition layer used as the gas barrier layer of the laminate film, and a component passing into the inside from a sealing part from an exposed portion of the sealant layer at the end of the laminate film peripheral edge.

Specifically, the thermal plastic resin composing the sealant layer is extremely high in the gas permeability and the moisture permeability as compared with the gas barrier layer. Hence, out of the atmospheric gas amount invading at time intervals into the inside of the vacuum insulation material, the majority is the portion passing into the inside through the sealing part from the exposed portion of the sealant layer at the end of the laminate film peripheral edge.

Therefore, to present a vacuum insulation material having an excellent adiabatic performance for a long period, it is indispensable to suppress the infiltration amount of atmospheric gas from the exposed portion of the sealant layer at the end of the laminate film peripheral edge, and its effective method has been studied.

To solve this problem, a vacuum insulation material has been reported by forming a thin-wall part by reducing the thickness in a part of the heat diffusion layer in the sealing part (see, for example, patent document 1).

FIG. 11 is a sectional view of the conventional vacuum insulation material disclosed in patent document 1. As shown in FIG. 11, vacuum insulation material 101 includes two laminate films 104 having gas barrier layers 102 and sealant layers 103, and a core material is sealed at a reduced pressure in a space formed by heating and fusing of them having sealant layers 103 opposite to each other. Vacuum insulation material 101 has a sealing part formed by mutual heating and fusing of sealant layers 103 by heating and pressing from the outside near the peripheral edge of two laminate films 103 so as to surround the whole circumference of the core material, and a part of sealant layers 103 in the sealing part of laminate films 104 is reduced in thickness in a prescribed width. This thin-wall part 105 is formed as shown in FIG. 12, in which a part of laminate films 104 as the sealing part is particularly heated and pressed intensively, by using sealing jig 106 consisting of an upper pattern and a lower pattern respectively having a heater at the protruding part and the inner part of an isosceles trapezoid.

In the conventional configuration, the penetration resistance of the gas invading from the end face of the laminate film peripheral edge is increased by thin-wall part 105, and the invasion of gas into inside is suppressed, and thereby it is believed that the excellent adiabatic performance may be maintained for a long period.

In patent document 1, nothing specific is mentioned is about the shape of laminate film 104 in thin-wall part 105. By using sealing jig 106 consisting of the upper pattern and the lower pattern respectively having the heater at the protruding part and the inner part of the isosceles trapezoid, a part of laminate film 104 as the sealing part is heated and pressed particularly intensively, a part of sealant layer 103 is reduced in thickness in a prescribed width, and thin-wall part 105 is formed. As a result, in thin-wall part 105, corners 107 are formed as shown in FIG. 11 and FIG. 12, and when manufacturing and handling vacuum insulation material 101, an external force is concentrated at corners 107, and cracks are formed in laminate film 104, especially in gas barrier layer 102, and the sealing part may be broken by the cracks. From such cracks or the broken position of the sealing part, in the course of a long time, invasion of atmospheric gas components into the inside of vacuum insulation material 101 may be promoted.

Herein, corners 107 are positions of angular shape (positions of a large degree of curvature) formed along with change in thickness of sealant layer 103, occurring in the boundary of thin-wall part 105 or its vicinity, when the sealing part is seen at a section cut along a plane perpendicular to the peripheral edge of laminate film 104.

Besides, since the protruding part of sealing jig 106 is an isosceles trapezoid, as compared with the portion pressed to the flat part at the leading end of the protruding part in laminate film 104, the portion opposite to the slope of the protruding part in laminate film 104 is less likely to be heated. Still more, since the majority of the portion for pressing laminate film 104 is a flat part at the leading end of the protruding part, the resin composing sealant layer 103 in the portion pressed to the flat part at the leading end of the protruding part in laminate film 104 is hardly allowed to escape to both sides. Accordingly, it was realistically difficult to reduce the thickness of thin-wall part 105 so much as illustrated.

By using sealing jig 106 consisting of an upper pattern and a lower pattern respectively having a heater at the protruding part and the inner part of an isosceles trapezoid, a part of laminate film 104 as the sealing part is particularly heated and pressed intensively, and thin-wall part 105 reduced in thickness in a prescribed thickness in part of sealant layer 103 is formed. Accordingly, the majority of the sealing part is the portion of forming thin-wall part 105, but since thin-wall part 105 is decreased in the resin for composing sealant layer 103 along the prescribed width, the adhering force for adhering two laminate films 104 together is lowered, and they may be easily peeled off by an external force. If the laminate films positioned in thin-wall part 105 are peeled off, an atmospheric gas may be easily infiltrated into the inside of vacuum insulation material 101 from the exposed portion of the sealant layer at the end face of the peripheral edge of the laminate films.

Meanwhile, gas barrier layer 102 is generally composed of a material relatively easier to transfer heat, among layers for composing laminate film 104. In particular, when gas barrier layer 102 is composed of an aluminum foil, or other metal foil or metal deposition layer, it is close to the forming portion of thin-wall part 105 along the prescribed width, and heat is likely to be transferred. That is, thin-wall part 105 plays a role of a heat bridge, and heat is likely to be transferred from gas barrier layer 102 of laminate film 104 at one heat transfer surface of vacuum insulation material 101 to gas barrier layer 102 of laminate film 104 at other heat transfer surface, and thereby the adiabatic performance of vacuum insulation material 101 is lowered.

Patent document 1: Unexamined Japanese Utility Model Application Publication No. 62-141190

SUMMARY OF THE INVENTION

The vacuum insulation material of the present invention is a vacuum insulation material including two laminate films each having a protective layer on one side, a sealant layer on other side, and a gas barrier layer between the protective layer and the sealant layer, a core material sealed at a reduced pressure between the two laminate films disposed so that the sealant layers may be opposite to each other, and a sealing part having the sealant layers fused to each other near the peripheral edge of the two laminate films so as to surround the whole circumference of the core material. Further, at least the sealing part at one side of the laminate films or the sealing part positioned in one direction of the core material out of the sealing parts surrounding the core material is heated and pressed to a temperature for fusing the sealant layer, but not fusing the protective layer and the gas barrier layer, from outside, so that a part of a resin for composing the sealant layer in a specific position may be moved to the sealant layer adjacent to a sealant layer at a specific position in a direction approaching the closest peripheral edge of the peripheral edges of the laminate film, or may be moved to the sealant layer adjacent to a sealant layer at a specific position in a reverse direction to the approaching direction. As a result, when seen from a section being cut off on a plane perpendicular to the closest peripheral edge, as going from the closest peripheral edge to the inner circumference of the laminate film, the interval between the gas barrier layer of the laminate film in one part of the sealing part and the gas barrier layer of the other laminate film of the sealing part is changed continuously. Further, in a portion changing in interval between the gas barrier layer of the laminate film in one part of the sealing part and the gas barrier layer of the other laminate film of the sealing part, there are a plurality of thin-wall parts in which the thickness of the sealant layer between the gas barrier layer of the laminate film in one part of the sealing part and the gas barrier layer of the other laminate film of the sealing part is smaller than the total thickness of the sealant layers between the gas barrier layer of one laminate film not heated and fused between the sealant layers and the gas barrier layer of the other laminate film not heated and fused between the sealant layers. Moreover, at the outer circumferential side of two adjacent thin-wall parts out of the plurality of the thin-wall parts and the thin-wall part positioned at the inner most circumferential side out of the plurality of thin-wall parts and at the outermost circumferential side of the plurality of the thin-wall parts positioned at the outermost circumferential side, there are a plurality of thick-wall parts in which the thickness of the sealant layer between the gas barrier layer of one laminate film is greater than the total thickness of the sealant layers between the gas barrier layer of one laminate film not heated and fused between the sealant layers and the gas barrier layer of the other laminate film not heated and fused between the sealant layers. Further, of the plurality of thin-wall parts, all sealant layers opposite to each other between two adjacent thin-wall parts are heated and fused.

In this configuration, the sealing part having the thin-wall part and the thick-wall part, when seen from a section being cut off on a plane perpendicular to the closest peripheral edge, as going from the closest peripheral edge to the inner circumference of the laminate film, is changed in the interval continuously (smoothly) between the gas barrier layer of the laminate film in one part of the sealing part and the gas barrier layer of the other laminate film of the sealing part, and therefore corners are not formed in each layer for composing the laminate film. Further, in the thin-wall part of the sealant layer, since there is no local portion for concentrating the external force, cracks of the gas barrier layer and breakages of the sealing part hardly occur.

Moreover, since the sealing part having the thin-wall part and the thick-wall part is changed continuously (smoothly) in the thickness of the sealant layer also in the thin-wall part, the thin-wall part can be reduced in thickness to a maximum extent. As a result, as compared with a case of specifying the thin-wall part in a constant thickness in the sealant layer of the thin-wall part in one position, it is easier to reduce the thickness of the sealant layer of the thinnest part of the thin-wall part.

Accordingly, the sealing part having the thin-wall part and the thick-wall part is reduced in the thickness of the sealant layer of the thinnest part of the thin-wall part, the thin-wall parts are provided at plural positions, and the opposite sealant layers between two adjacent thin-wall parts out of the plurality of the thin-wall parts are all heated and fused. As a result, the passing area of gas and moisture invading from the end side of the laminate film peripheral edge is reduced, and the passing resistance of gas and moisture is increased, and the passing speed of gas and moisture is decreased, and thereby the amount of passing gas and moisture is suppressed at gradual time intervals, and an excellent adiabatic performance can be maintained for a long period.

The adhering force of the sealing part becomes stronger as the thickness of the sealant layer is increased generally along with the thickness of the sealant layer, and thick-wall parts are formed between two adjacent thin-wall parts, and between the inner circumferential side of the thin-wall part positioned at the innermost circumferential side and the outer circumferential side of the thin-wall part positioned at the outermost circumferential side, and therefore the thickness of the sealant layer is increased or decreased smoothly from the thinnest part of the thin-wall part to the thickest part of the thick-wall part. In addition, the opposite sealant layers between two adjacent thin-wall parts out of the plurality of the thin-wall parts are all heated and fused. Hence, the sealing part having the thin-wall part is hardly peeled by an external force either from the inner circumferential side or from the outer circumferential side.

In the sealing part having the thin-wall part and the thick-wall part, moreover, the thin-wall parts are provided at plural positions, but by increasing and decreasing the thickness of the sealant layer continuously (smoothly) also in the thin-wall parts, the thinnest part of the thin-wall parts is narrowed, and effects of heat bridge can be decreased.

Also in the thin-wall parts, the strength of the laminate film is lower than in the peripheral parts, and concentration of load may be considered when an external force is applied, but since the thin-wall parts are provided at plural positions, the load of the external force is diffused, and cracks in the thin-wall parts and breakages of the sealing part can very hardly occur.

In the case of a plurality of thin-wall parts, as compared with a case of one thin-wall part, if the thickness of the sealant layer is increased in the thin-wall part, the same effects are obtained, and decline of laminate film strength or seal strength in the thin-wall parts is lessened, and the risk of cracks in the thin-wall parts and breakages of the sealing part can be lowered.

Further, when two laminate films both have metal foil layers as gas barrier layers, approaching of the distance between two layers of metal foils in the sealing part is lessened, and the increase of thermal conductivity by heat leak can occur very rarely.

From such point of view, the number of thin-wall parts is desired to be more, and usually four to six pieces are desired, though variable depending on the width of the sealing part.

When the core material is a glass fiber, through-pinholes are likely to be formed from the inside of the vacuum insulation material to the laminate film due to the glass fiber.

Usually, as a measure for preventing occurrence of pinholes, it is believed effective to increase the thickness of the sealant layer at the innermost layer of the laminate film facing the inside of the vacuum insulation material, but by increasing the thickness of the sealant layer, it may be feared that the area of the gas invasion path at the section of the sealing part may be widened.

In the vacuum insulation material of the present invention, since the gas invasion amount can be controlled in the thin-wall parts, if the thickness of the sealant layer is increased, it is possible to suppress the increase of gas and moisture invading into the inside of the vacuum insulation material through the sealing part from the end surface of the laminate film peripheral edge.

According to the configuration of the present invention, if a thin-wall part reduced in thickness in a part of the sealant layer is formed in the sealing part, in the thin-wall part of the sealant layer provided in the sealing part and in its vicinity, cracks and breakages of the sealing part can very hardly occur. Further, it is easy to reduce the thickness of the thinnest part of the thin-wall part, and the sealing part having the thin-wall part is hardly peeled by an external force, and there is a very slight effect of heat bridge, so that a vacuum insulation material maintaining an excellent adiabatic performance for a long period can be presented.

The manufacturing method of a vacuum insulation material of the present invention is a manufacturing method of a vacuum insulation material including two laminate films each having a protective layer on one side, a sealant layer on other side, and a gas barrier layer between the protective layer and the sealant layer, a core material sealed at a reduced pressure between the two laminate films disposed so that the sealant layers may be opposite to each other, and a sealing part having the sealant layers fused to each other near the peripheral edge of the two laminate films so as to surround the whole circumference of the core material. Further, at least the sealing part at one side of the laminate films or the sealing part positioned in one direction of the core material out of the sealing parts surrounding the core material is heated and fused as being heated and pressed from outside to two overlapped laminate films. Moreover, as seen from a section being cut off on a plane perpendicular to the closest peripheral edge, out of the peripheral edge of the laminate film, as going from the closest peripheral edge to the inner circumference of the laminate film, a pressure is applied from the protective layer side to the sealant layer side, so that the portion relatively increased in the compression width of the laminate film being compressed in the thickness direction on the way may be formed in a plurality of positions, and that the compression width of the portion of the laminate film compressed in the thickness direction may be changed continuously. At the same time, by heating to a temperature for fusing the sealant layer, but not fusing the protective layer and the gas barrier layer, in a specified range not only in the compressed portion but also near the compressed portion, a part of a resin for composing the sealant layer in a portion of the laminate film compressed in the thickness direction may be moved to the sealant layer in a portion of the adjacent laminate film not compressed in the thickness direction, and thereby a plurality of thin-wall parts are formed, in which the thickness of the sealant layer between the gas barrier layer of the laminate film in one part of the sealing part is smaller than the total thickness of the sealant layers between the gas barrier layer of one laminate film other than the sealing part and the gas barrier layer of the other laminate film other than the sealing part. Moreover, at the inner circumferential side of the thin-wall part positioned at the innermost circumferential side out of the plurality of thin-wall part between two adjacent thin-wall parts out of the plurality of the thin-wall parts and at the outer circumferential side of the thin-wall part positioned at the outermost circumferential side out of the plurality of thin-wall parts, a thick-wall part is formed in which the thickness of the sealant layer between the gas barrier layer of one laminate film and the gas barrier layers of other laminate film is greater than the total thickness of the sealant layers between the gas barrier layer of one laminate film other than the sealing part and the gas barrier layer of other laminate film than the sealing part. Further, of the plurality of thin-wall parts, all sealant layers opposite to each other between two adjacent thin-wall parts are heated and fused.

In the vacuum insulation material manufactured in this manufacturing method, the sealing part having the thin-wall part and the thick-wall part, when seen from a section being cut off on a plane perpendicular to the closest peripheral edge, as going from the closest peripheral edge to the inner circumference of the laminate film, is pressed from the protective layer side to the heat fusion side, so as to be changed continuously (smoothly) in the compression width in the portion of the laminate film compressed in the thickness direction. At the same time, not only in the portion to be compressed but also near the compressed portion, in a prescribed range, by heating to a temperature so that the sealant layer may be fused, but that the protective layer and the gas barrier layer are not fused, and thereby corners are not formed in each layer for composing the laminate film. In the thin-wall part, too, the thickness of the sealant layer can be increased or decreased continuously (smoothly), and outer forces are not concentrated locally in any of the portion of the thin-wall part of the sealant layer, and cracks of the gas barrier layer or breakages of the sealing part occur very rarely.

Further, when seen from a section being cut off on a plane perpendicular to the closest peripheral edge, as going from the closest peripheral edge to the inner circumference of the laminate film, it is pressed from the protective layer side to the heat fusion side so as to be changed continuously (smoothly) in the compression width in the portion of the laminate film compressed in the thickness direction. At the same time, not only in the portion to be compressed but also near the compressed portion, in a prescribed range, they are heated to a temperature so that the sealant layer may be fused, but that the protective layer and the gas barrier layer are not fused. As a result, the thinnest part of the thin-wall part may be narrowed, and as compared with the thin-wall part defined in a specific thickness of the sealant layer of the thin-wall part at one position, it is easier to reduce the thickness of the sealant layer of the thinnest part of the thin-wall part.

Accordingly, the sealing part having the thin-wall part and the thick-wall part is reduced in the thickness of the sealant layer of the thinnest part of the thin-wall part, the thin-wall parts are provided at plural positions, and the opposite sealant layers between two adjacent thin-wall parts out of the plurality of the thin-wall parts are all heated and fused. As a result, the passing area of gas and moisture invading from the end side of the laminate film peripheral edge is reduced, and the passing resistance of gas and moisture is increased, and the passing speed of gas and moisture is decreased, and thereby the amount of passing gas and moisture is suppressed at gradual time intervals, and an excellent adiabatic performance can be maintained for a long period.

The adhering force of the sealing part becomes stronger as the thickness of the sealant layer is increased generally along with the thickness of the sealant layer, and thick-wall parts are formed between two adjacent thin-wall parts, and between the inner circumferential side of the thin-wall part positioned at the innermost circumferential side and the outer circumferential side of the thin-wall part positioned at the outermost circumferential side, and therefore the thickness of the sealant layer is increased or decreased smoothly from the thinnest part of the thin-wall part to the thickest part of the thick-wall part. In addition, the opposite sealant layers between two adjacent thin-wall parts out of the plurality of the thin-wall parts are all heated and fused, and the sealing part having the thin-wall part is hardly peeled by an external force either from the inner circumferential side or from the outer circumferential side.

In the sealing part having the thin-wall part and the thick-wall part, moreover, the thin-wall parts are provided at plural positions, but by increasing and decreasing the thickness of the sealant layer continuously (smoothly) also in the thin-wall parts, the thinnest part of the thin-wall parts is narrowed, and effects of heat bridge can be decreased.

Hence, if the thin-wall part reduced in thickness in a part of the sealant layer is formed in the sealing part, in the thin-wall part of the sealant layer provided in the sealing part and in its vicinity, cracks or breakages of the sealing part occur very rarely, and moreover the thinnest part of the thin-wall part is likely to be thin, and the sealing part having the thin-wall part is hardly peeled by an external force, and effects of the heat bridge are small, so that a vacuum insulation material capable of maintaining the excellent adiabatic performance for a long period can be presented.

Other manufacturing method of a vacuum insulation material of the present invention is a manufacturing method of a vacuum insulation material including two laminate films each having a protective layer on one side, a sealant layer on other side, and a gas barrier layer between the protective layer and the sealant layer, a core material sealed at a reduced pressure between the two laminate films disposed so that the sealant layers may be opposite to each other, and a sealing part having the sealant layers fused to each other near the peripheral edge of the two laminate films so as to surround the whole circumference of the core material. Further, at least the sealing part at one side of the laminate films or the sealing part positioned in one direction of the core material out of the sealing parts surrounding the core material is heated and fused as being heated and pressed from outside to two overlapped laminate films. Moreover, in a direction going from the closest peripheral edge of the peripheral edge of the laminate film to the inner circumference of the laminate film, a pressure is applied from the protective layer side to the sealant layer side, so that the portion relatively stronger in the pressing force when heating and pressing may be formed at plural positions on the way, and that the pressing force may be changed continuously. At the same time, in a specified range not only in the compressed portion but also near the compressed portion, by heating to a temperature for fusing the sealant layer, but not fusing the protective layer and the gas barrier layer, a part of a resin for composing the sealant layer in a portion relatively stronger in the pressing force is moved to the sealant layer in a portion relatively weak in pressing force or a portion not pressed being adjacent to the pressed portion, and thereby a plurality of thin-wall parts are formed, in which the thickness of the sealant layer between the gas barrier layer of the laminate film in one part of the sealing part is smaller than the total thickness of the sealant layers between the gas barrier layer of one laminate film other than the sealing part and the gas barrier layer of the other laminate film other than the sealing part. Moreover, at the inner circumferential side of the thin-wall part positioned at the innermost circumferential side out of the plurality of thin-wall part between two adjacent thin-wall parts out of the plurality of the thin-wall parts and at the outer circumferential side of the thin-wall part positioned at the outermost circumferential side out of the plurality of thin-wall parts, a thick-wall part is formed, in which the thickness of the sealant layer between the gas barrier layer of one laminate film and the gas barrier layers of other laminate film is greater than the total thickness of the sealant layers between the gas barrier layer of one laminate film other than the sealing part and the gas barrier layer of other laminate film than the sealing part. Further, of the plurality of thin-wall parts, all sealant layers opposite to each other between two adjacent thin-wall parts are heated and fused.

In this manufacturing method, the sealing part having the thin-wall part and the thick-wall part is pressed from the protective layer side to the sealant layer side, in a direction going from the closest peripheral edge of the peripheral edge of the laminate film to the inner circumference of the outer sheath material, so that the portion relatively stronger in the pressing force when heating and pressing may be formed at plural positions on the way, and that the pressing force may be changed continuously (smoothly). At the same time, by heating to a temperature for fusing the sealant layer, but not fusing the protective layer and the gas barrier layer, in a specified range not only the pressed portion but also near the pressed portion, corners are not formed in each layer for composing the laminate film. Also in the thin-wall part, the thickness of the sealant layer can be increased or decreased continuously (smoothly), and there is no portion of local concentration of external forces in the thin-wall part of the sealant layer, and cracks of the gas barrier layer or breakages of the sealing part can occur very rarely.

Further, it is pressed from the protective layer side to the heat fusion side so that the pressing force may be changed continuously (smoothly) while the pressing force when heating and pressing may be relatively strong in plural portions on the way, in a direction going from the closest peripheral edge to the inner circumference of the laminate film. At the same time, not only in the portion to be compressed but also near the compressed portion, in a prescribed range, they are heated to a temperature so that the sealant layer may be fused, but that the protective layer and the gas barrier layer are not fused. As a result, the thinnest part of the thin-wall part may be narrowed, and as compared with the thin-wall part defined in a specific thickness of the sealant layer of the thin-wall part at one position, it is easier to reduce the thickness of the sealant layer of the thinnest part of the thin-wall part.

Accordingly, the sealing part having the thin-wall part and the thick-wall part is reduced in the thickness of the sealant layer of the thinnest part of the thin-wall part, the thin-wall parts are provided at plural positions, and the opposite sealant layers between two adjacent thin-wall parts out of the plurality of the thin-wall parts are all heated and fused. As a result, the passing area of gas and moisture invading from the end side of the laminate film peripheral edge is reduced, and the passing resistance of gas and moisture is increased, and the passing speed of gas and moisture is decreased, and thereby the amount of passing gas and moisture is suppressed at gradual time intervals, and an excellent adiabatic performance can be maintained for a long period.

The adhering force of the sealing part becomes stronger as the thickness of the sealant layer is increased generally along with the thickness of the sealant layer, and thick-wall parts are formed between two adjacent thin-wall parts, and between the inner circumferential side of the thin-wall part positioned at the innermost circumferential side and the outer circumferential side of the thin-wall part positioned at the outermost circumferential side, and therefore the thickness of the sealant layer is increased or decreased smoothly from the thinnest part of the thin-wall part to the thickest part of the thick-wall part. In addition, the opposite sealant layers between two adjacent thin-wall parts out of the plurality of the thin-wall parts are all heated and fused, and the sealing part having the thin-wall part is hardly peeled by an external force either from the inner circumferential side or from the outer circumferential side.

In the sealing part having the thin-wall part and the thick-wall part, moreover, the thin-wall parts are provided at plural positions, but by increasing and decreasing the thickness of the sealant layer continuously (smoothly) also in the thin-wall parts, the thinnest part of the thin-wall parts is narrowed, and effects of heat bridge can be decreased.

Hence, if the thin-wall part reduced in thickness in a part of the sealant layer is formed in the sealing part, in the thin-wall part of the sealant layer provided in the sealing part and in its vicinity, cracks or breakages of the sealing part occur very rarely, and moreover the thinnest part of the thin-wall part is likely to be thin, and the sealing part having the thin-wall part is hardly peeled by an external force, and effects of the heat bridge are small, so that a vacuum insulation material capable of maintaining the excellent adiabatic performance for a long period can be presented.

PREFERRED EMBODIMENTS FOR CARRYING OUT THE INVENTION

Preferred embodiments of the present invention are described below by reference to the accompanying drawings.

It must be noted however that the present invention is not limited by these preferred embodiments alone.

Preferred Embodiment 1

Figure 1:
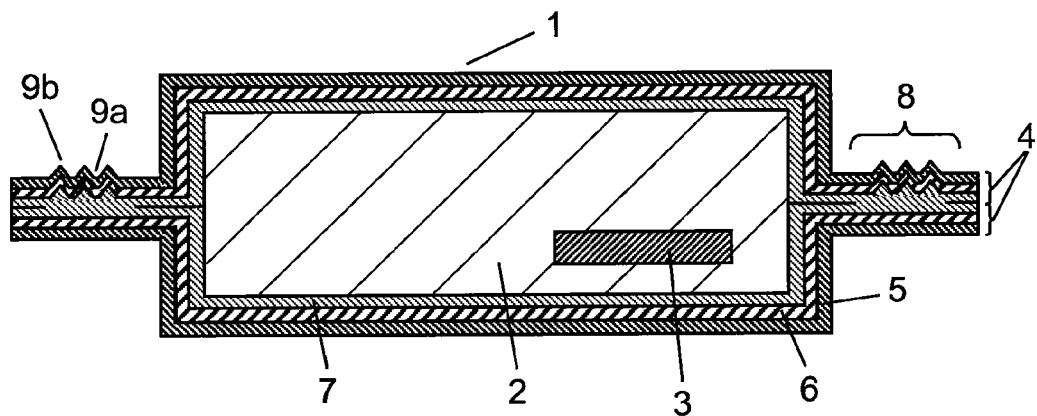
FIG. 1 is a sectional view of a vacuum insulation material in preferred embodiment 1 of the present invention.
Figure 2:
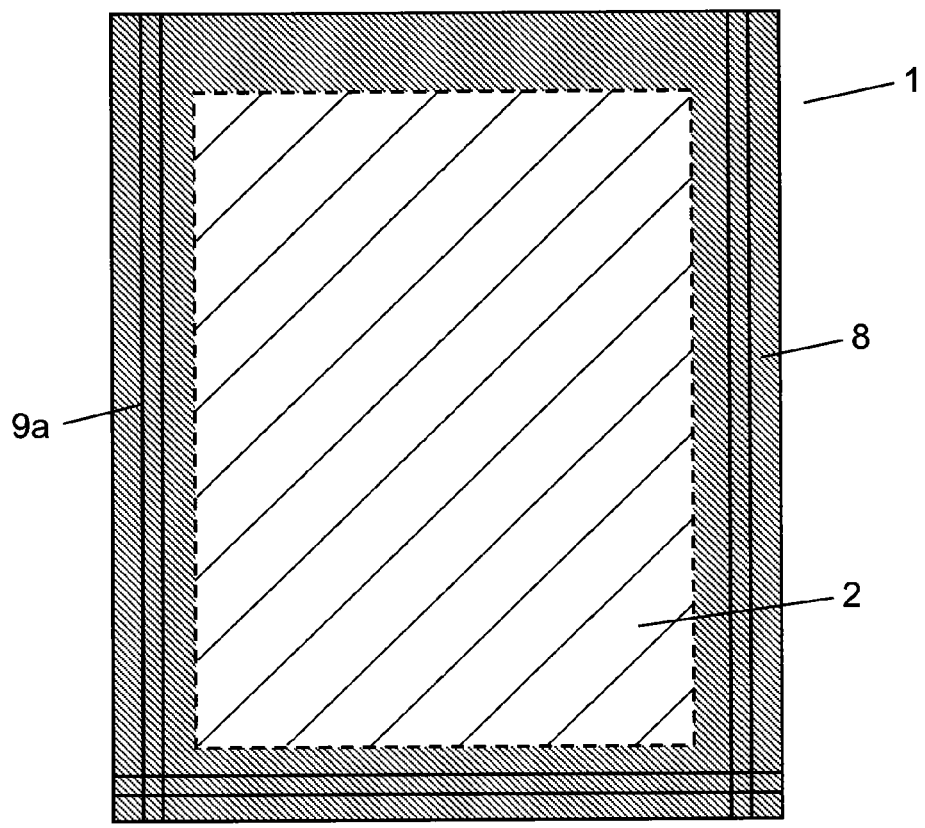
FIG. 2 is a plan view of the vacuum insulation material in preferred embodiment 1 of the present invention.
Figure 3:
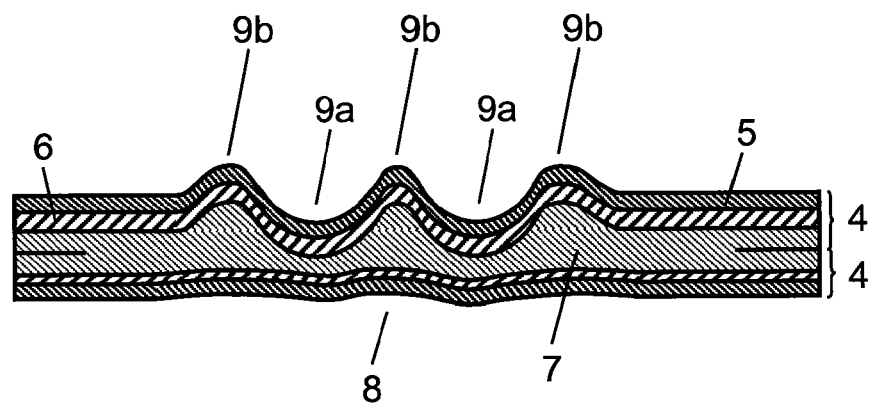
FIG. 3 is a sectional view showing a sealing part having a thin-wall part and a thick-wall part of the vacuum insulation material in preferred embodiment 1 of the present invention.
Figure 4:
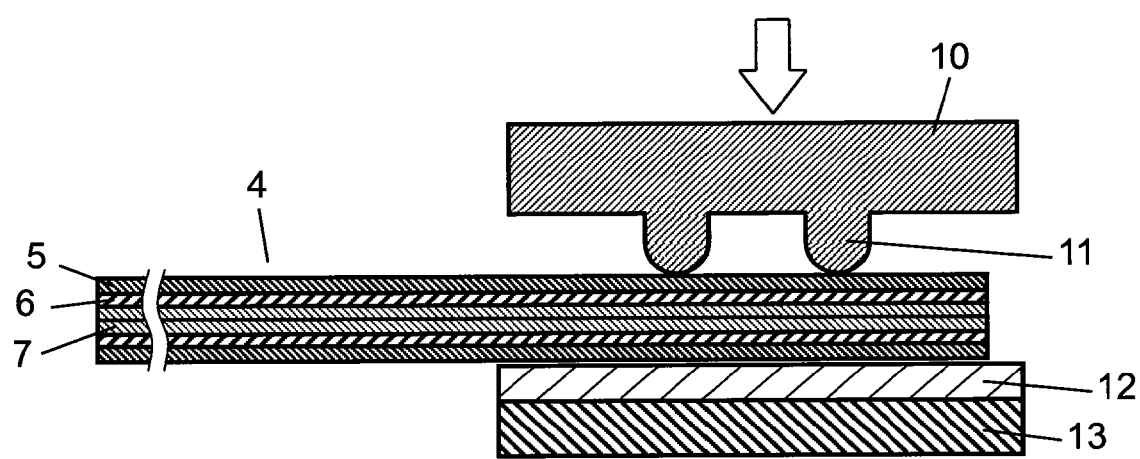
FIG. 4 is a sectional view showing an example of a heating and pressing operation of an laminate film by a pressing and compressing jig of the vacuum insulation material in preferred embodiment 1 of the present invention.
Figure 5:
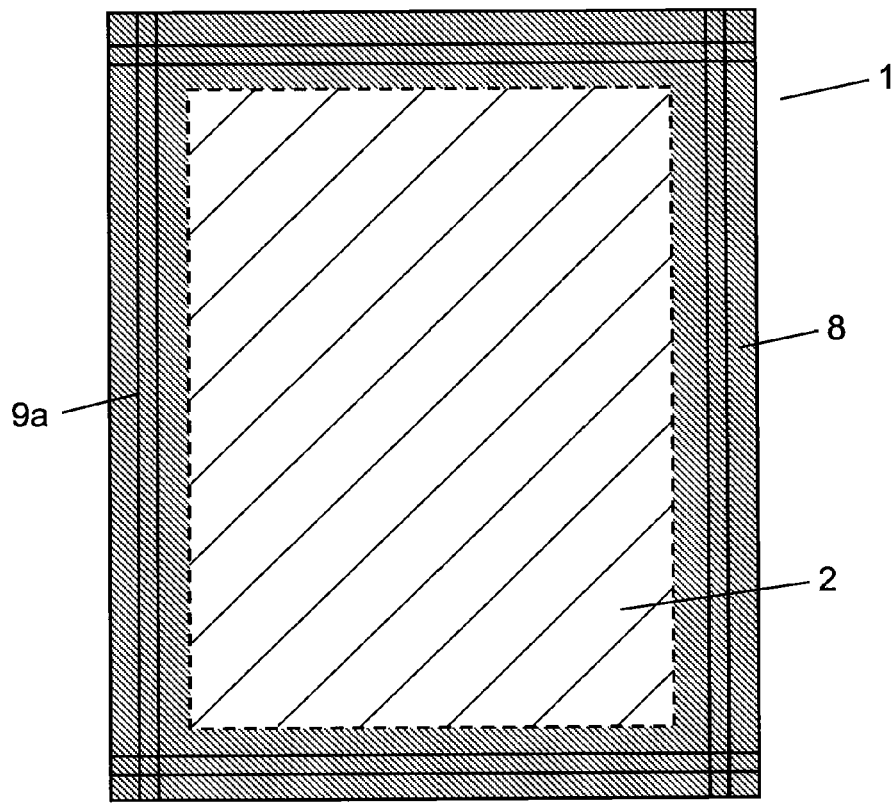
FIG. 5 is a plan view of other example of the vacuum insulation material in preferred embodiment 1 of the present invention.
Figure 6:
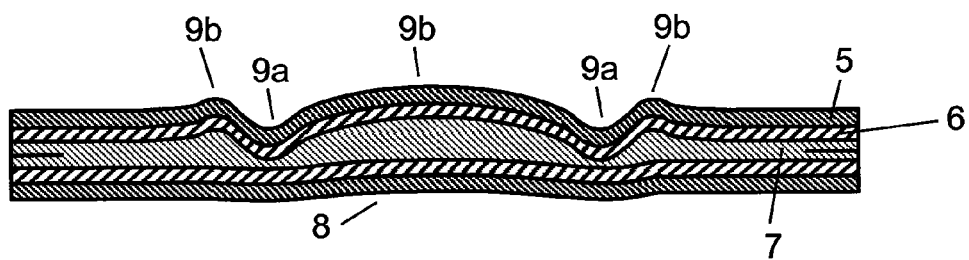
FIG. 6 is a sectional view of a modified example of the sealing part having the thin-wall part and the thick-wall part of the vacuum insulation material in preferred embodiment 1 of the present invention.

FIG. 1 is a sectional view of a vacuum insulation material in preferred embodiment 1 of the present invention. FIG. 2 is a plan view of the vacuum insulation material of the preferred embodiment. FIG. 3 is a sectional view showing a sealing part having a thin-wall part and a thick-wall part of the vacuum insulation material of the preferred embodiment. FIG. 4 is a sectional view showing an example of a heating and pressing operation of an laminate film by a pressing and compressing jig of the vacuum insulation material of the preferred embodiment. FIG. 5 is a plan view of other example of the vacuum insulation material in preferred embodiment 1 of the present invention. FIG. 6 is a sectional view of a modified example of the sealing part having the thin-wall part and the thick-wall part of the vacuum insulation material in preferred embodiment 1 of the present invention.

As shown in FIG. 1, vacuum insulation material 1 of the preferred embodiment includes adsorbent 3 disposed between core material 2 and core material 2, and two laminate films 4 of a rectangular shape cut in a same dimension, and between two laminate films 4, core materials 2 and adsorbent 3 are sealed at a reduced pressure, and outer circumferential parts near the peripheral edges of two laminate films 4 for covering core materials 2 are mutually heated and fused.

Two laminate films 4 are formed by laminating protective layer 5, gas barrier layer 6, and sealant layer 7 sequentially from the outer layer side. Around the circumference of laminate film 4 (on the outer circumference), sealing part 8 is formed by fusing and adhering sealant layers of the laminate film, and, for example, thin-wall part 9a and thick-wall part 9b are formed along the periphery at three sides, as shown in FIG. 2, out of four sides of sealing part 8.

The shape of sealing part 8 around thin-wall part 9a and thick-wall part 9b is explained. FIG. 3 is a sectional view being cut along a plane perpendicular to the closest peripheral edge of the peripheral edge of laminate film 4 of vacuum insulation material 1. In the diagram, supposing the right side to be the peripheral edge, on both sides of sealant layer 7, the interval between gas barrier layer 6 of one laminate film 4 at the upper side and gas barrier layer 6 of other laminate film 4 at the lower side formed to be changed continuously from the right side (peripheral edge) to the left side (the inner circumferential side). In other words, there is a difference in the altitude of the wave crest of arc-shaped concave and convex parts of the boundary between sealant layer 7 and gas barrier layer 6, and the deepest part of the concave part of sealant layer 7 on the boundary corresponds to the position of thin-wall part 9a. The highest part of the convex part of the arc shape of sealant layer 7 on the boundary corresponds to the position of thick-wall part 9b.

The composing materials of the vacuum insulation material are explained. Sealant layer 7 for composing laminate film 4 is not particularly specified, and usable examples include low-density polyethylene film, straight-chain low-density polyethylene film, high-density polyethylene film, medium-density polyethylene film, polypropylene film, polyacrylonitrile film, other thermoplastic resins, or their mixed films.

The thickness of the sealant layers of these two laminate films 4 may be either same or different. The materials of sealant layers 7 of these two laminate films 4 are preferred to be same in consideration of the fusing temperature and the adhesive strength of the sealing part.

The material of core material 2 is not particularly specified, but preferred examples include a porous material having a vapor layer ratio of about 90%, such as urethane foam, styrene foam, phenol foam, or other continuous foam material, glass wool, rock wool, alumina fiber, silica alumina fiber, or inorganic fiber material, polyester fiber, other organic fiber material, pearlite, wet silica, dry silica, other powder material, and other known core materials. Further, a fiber material and a powder material may be mixed to form a core material.

When using a fiber material in core material 2, it is preferred to orient fibers nearly at right angle to the thickness direction of the vacuum insulation material (core material), and it is preferred not to bind the fibers by using a binder or other agent, thereby avoiding formation of heat bridge at the intersection of the fibers. Or when a powder material is used as the core material, it is preferred to put the powder material in a permeable bag. Other composing materials not described herein will be further discussed in the following explanation of the manufacturing method later.

A laminate adhesive agent used in bonding of layers of protective layer 5 for composing laminate film 4, gas barrier layer 6, and sealant layer 7 is not particularly specified, but preferred examples include two-pack curing type urethane adhesive agent, known adhesive agent for laminate, and epoxy resin adhesive agent.

In the present application, "continuous change" means "continuous change of temperature, sound or light" in the meaning of the term "analog", and is synonymous to "smooth change." That is, it is not changed suddenly on the way.

In this preferred embodiment, referring to FIG. 1 to FIG. 3, an example of the manufacturing method of vacuum insulation material 1 of the preferred embodiment is explained below. First of all, two laminate films 4 are disposed so that sealant layers 7 may face each other, and three sides around laminate films 4 are heated and fused, and a bag is formed. At this time of heating and fusing, as shown in FIG. 4, two laminate films 4 are heated and compressed as being enveloped by metal-made upper heating and compressing jig 10 having a heater, silicone rubber sheet 12, and lower heating and compressing jig 13 having a heater, and sealing part 8 is formed in a shape as shown in FIG. 3. Later, core material 2 and adsorbent 3 are inserted into the bag, and the bag is being evacuated, and the opening part of the bag of laminate films 4 is heated, fused and closed by using an ordinary flat jig. As a result, vacuum insulation material 1 is obtained by forming sealing part 8 having thin-wall part 9a and thick-wall part 9b on three sides around laminate film 4, and forming sealing part 8 composed of sealant layers of nearly uniform thickness not having thin-wall part 9a and thick-wall part 9b on one remaining side.

Herein, two laminate films 4 not heated and fused were heated and compressed by upper and lower heating and compressing jigs 10, 13, and sealing parts 8 having thin-wall part 9a and thick-wall part 9b were formed at the same time. Instead, on the peripheral edge of two laminate films 4, by using an ordinary flag jig, sealing part 8 composed of sealant layers of a nearly uniform thickness, not having thin-wall part 9a and thick-wall part 9b may be formed, and further sealing part 8 may be heated and compressed by upper and lower heating and compressing jigs 10, 13, and so that thin-wall part 9a and thick-wall part 9b may be formed on the peripheral edge of laminate film 4 as shown in FIG. 5.

When sealing the fourth side of the bag opening part, it is required to seal by using a vacuum packaging machine in order to seal while evacuating the inside of the bag.

An ordinary vacuum packaging machine is provided with a heat seal jig of a flat plate shape, and only the opening part of the bag may be processed by the vacuum packaging machine to form sealing part 8 having a sealant layer 7 of a nearly uniform thickness, and then thin-wall part 9a and thick-wall part 9b may be formed by using heating and compressing jigs 10, 13.

In vacuum insulation material 1 of the preferred embodiment, between two rectangular laminate films 4 having mutually opposite sealant layers 7, core material 2 and adsorbent 3 are sealed at a reduced pressure, and outer circumferential parts of three sides near the peripheral edge of two laminate films 4 covering core material 2 are heated and fused. Of sealing part 8 heated and fused between outer circumferential parts of laminate film 4, when sealing parts 8 on three sides are seen from a section being cut off one a plane perpendicular to the peripheral edge, sealant layer 7 positioned at sealing part 8 has an arc-shaped concave part (including a nearly arc shape), and at the deepest part of the concave part, thin-wall part 9a having the thickness of sealant layer 7 smaller than the peripheral part of the deepest part is formed.

On both sides of sealant layer 7 of sealing part 8, there is a boundary from other layer (gas barrier layer 6), and the wave crest of the undulation of one boundary side is hither than the wave crest of the undulation of other boundary side.

Meanwhile, the deepest part of the portion of the concave at the side of sealant layer 7 on one boundary side of sealant layer 7 is not opposite to the deepest part of the portion of the concave at the side of sealant layer 7 on other boundary side. In the example shown in FIG. 3, two thin-wall parts 9a are formed on sealing part 8.

In vacuum heat insulating part 1 having such configuration, its operation and action are explained below. First, core material 2 plays the role of forming fine spaces (fine gaps) as aggregates of heat insulating material 1, and forms an adiabatic part of vacuum insulation material 1 after vacuum exhausting, and it is made of glass fiber.

Adsorbent 3 plays the role of adsorbing and removing residual gas components released into vacuum insulation material 1 from the fine gasps in core material 2 after vacuum packaging, or moisture or gas invading into vacuum insulation material 1.

Laminate film 4 is formed by laminating thermoplastic resins or metal foils or resin films having a gas barrier effect, and plays the role of suppressing invasion of atmospheric gas into vacuum insulation material 1 from outside.

Protective layer 5 is formed at the outer layer side from gas barrier layer 6, out of the layers of laminate film 4, and plays the role of preventing injury or breakage of laminate film 4, in particular, gas barrier layer 6, from external forces.

Examples of protective layer 5 include nylon film, polyethylene terephthalate film, polypropylene film, and other known materials, and one type may be used, or two or more types may be combined.

Gas barrier layer 6 is a layer composed of one or two or more types of film having a high gas barrier effect, and provides laminate film 4 with an excellent gas barrier effect.

Examples of gas barrier layer 6 include aluminum foil, copper foil, stainless steel foil, and other metal foils. Other examples include a film of polyethylene terephthalate film or ethylene-vinyl alcohol copolymer film evaporated with aluminum, copper or other metal atoms, or alumina or silica, or other metal oxides, and coated films evaporated with metal atoms or metal oxides.

Sealant layer 7 plays the role of fusing laminate films 4 mutually, and maintaining a vacuum status inside of vacuum insulation material 1, and also protecting gas barrier layer 6 from piercing from the inside of vacuum insulation material 1 by core material 2 or adsorbent 3.

Sealing part 8 is composed by fusing sealant layers 7 of laminate film 4 mutually, and plays the role of shielding between the inside and the outside of vacuum insulation material 1.

Thin-wall part 9a plays the role of suppressing the passing speed of atmospheric gas invading into the inside of vacuum insulation material 1 by way of sealing part 8 from the end side of the peripheral edge of laminate film 4, and maintaining the degree of vacuum of vacuum insulation material 1.

Thus, in this preferred embodiment, thin-wall part 9a is provided at the deepest position of the concave part of the arc shape (including a nearly arc shape) of the boundary surface of sealant layer 7 and gas barrier layer 6 in sealing part 8, and a difference is provided in the crest height of the concave part of the boundary side of these two layers, and hence deterioration or breakage of gas barrier layer 6 and laminate film 4 may occur very rarely, and gradual invasion of atmospheric gas into the inside of vacuum insulation material 1 can be suppressed.

Figure 12:
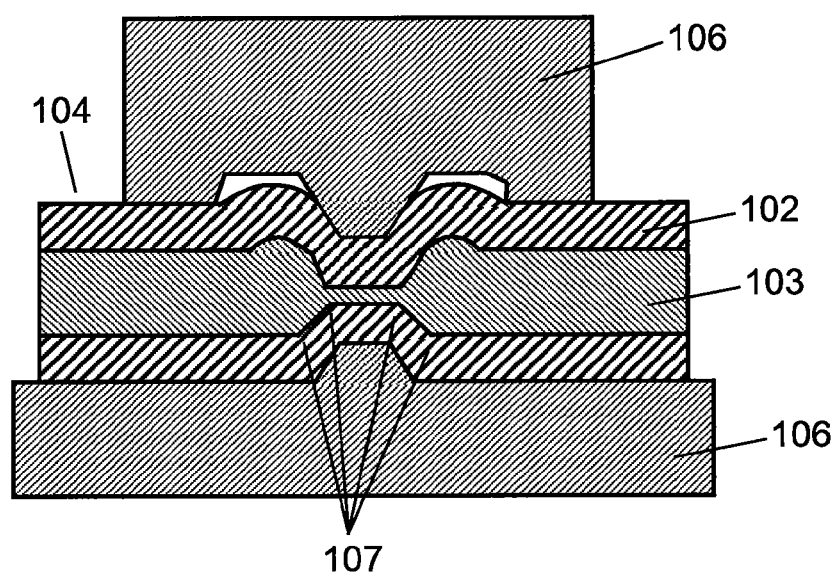
FIG. 12 is a sectional view showing a state of forming a thin-wall part by a heating and compressing jig of the conventional vacuum insulation material.

When vacuum insulation material 1 is manufactured in this manufacturing method, usually, since sealant layer 7 is heated and compressed by upper heating and compressing jig 10 having protrusion 11 provided with an arc-shaped curvature as shown in FIG. 4, the external fore by pressing is applied also in a direction perpendicular to the tangential line of the arc of protrusion 11, and the resin of sealant layer 7 is likely to be fluidized in the directions of both ends of thin-wall part 9a, and as compared with a conventional case of being compressed on a flat plane by sealing jig 106 as shown in FIG. 12, the temperature conditions and pressure conditions when manufacturing in the case of obtaining the same thickness of thin-wall part 9a may be lessened, and deterioration of gas barrier layer 6 and outer shield material 4 may be suppressed.

In other words, in the same forming conditions, it is possible to reduce the thickness of thin-wall part 9a of sealant layer 7 further, and it is easier to suppress invasion of gas or moisture from the end side of laminate film 4.

Vacuum insulation material 1 of the preferred embodiment is composed of two rectangular laminate films 4 having sealant layers 7 facing opposite to each other, in which core material 2 and adsorbent 3 are sealed at a reduced pressure, and outer circumferential parts of three sides near the peripheral edge of two laminate films 4 covering core material 2 are heated and fused. Of sealing parts 8 heated and fused between the outer circumferential parts of laminate film 4, when sealing parts 8 at three sides are seen from a section being cut off on a plane perpendicular to the peripheral edge, sealant layer 7 positioned at sealing part 8 has an arc-shaped concave part (including a nearly arc shape), and in the deepest part of the concave part, thin-wall part 9a smaller in the thickness of sealant layer 7 than in the peripheral part of the deepest part is formed.

In this configuration, when at least a part of sealing part 8 heated and fused between the peripheral edge parts of laminate film 4 is seen from the section being cut off on a plane perpendicular to the peripheral edge, there is thin-wall part 9a locally small in the thickness of sealant layer 7 of sealing part 8. As a result, in thin-wall part 9a of sealant layer 7, the passing area of gas and moisture invading from the end side of the laminate film 4 peripheral edge is reduced, the passing resistance of gas and moisture is increased, and the passing speed of gas and moisture is decreased, and thereby the amount of passing gas and moisture is suppressed at gradual time intervals, and an excellent adiabatic performance can be maintained for a long period.

Moreover, when at least a part of sealing part 8 heated and fused between the peripheral edge parts of laminate film 4 is seen from the section being cut off on a plane perpendicular to the peripheral edge, sealant layer 7 positioned at sealing part 8 has an arc-shaped concave part (including a nearly arc shape). The layer laminated at the outer layer side from sealant layer 7 (gas barrier layer 6) is, at thin-wall part 9a of sealing part 8 and its vicinity, free from arc-shaped bent parts or corner parts along the shape of sealant layer 7, and hence cracks are hardly caused the layer laminated at the outer layer side from sealant layer 7 (gas barrier layer 6).

Herein, preferably, corner parts should not be formed not only in thin-wall part 9a of sealant layer 7 and its vicinity, but also in the entire area of sealing part 8.

Further, in thin-wall part 9a of sealant layer 7, the thickness of sealant layer 7 is smaller than in the peripheral parts, and the strength is lowered by the portion of decrement of the thickness. However, when the concave part of sealant layer 7 has an arc-shaped portion (including a nearly arc shape), as the thickness of sealant layer 7 is increased or decreased gradually and smoothly along the arc, the strength (bending strength or the like) of sealing part 8 is also increased or decreased continuously and smooth along with the change in position. As a result, an external force is not concentrated locally in thin-wall part 9a of sealant layer 7, and thin-wall part 9a of sealant layer 7 and its vicinity, cracks of laminate film 4 breakages of sealing part 8 can occur very rarely.

Owing to these reasons, in thin-wall part 9a of sealant layer 7 provided in sealing part 8 and in its vicinity, cracks and breakages of sealing part 8 can occur very hardly, and vacuum insulating material 1 capable of maintaining an excellent adiabatic performance for a long period can be presented.

Also in vacuum insulation material 1 of the preferred embodiment, on both sides of sealant layer 7 of sealing part 8, there are boundary sides with other layers (gas barrier layers 6), and the crest height of undulation of one boundary side is higher than the crest height of undulation of other boundary side.

In thin-wall part 9a and its vicinity, layers 6, 5 of laminate film 4 at the outer layer side from sealant layer 7 are distorted, bent and stressed along the shape of sealant layer 7 in the arc-shaped concave part (including a nearly arc shape), and the strength is lowered.

Hence, the crest height of undulation of one boundary side (the upper side in FIG. 1) is set higher than the crest height of undulation of other boundary side (the lower side in FIG. 1). As a result, decline of strength of laminate film 4 at the boundary side (the lower side in FIG. 1) having a relatively smaller crest height is slight as compared with that of laminate film 4 at the other boundary side (the upper side in FIG. 1) having a relatively larger crest height. Accordingly, in sealing part 8 of laminate film 4, laminate film 4 of smaller strength decline (the lower side in FIG. 1) is supported by other laminate film 4 (the upper side in FIG. 1), and the rigidity is maintained, and when exposed to an external force, cracks and breakages of sealing part 8 are hardly caused.

By the presence of thin-wall part 9a, not only the thickness of sealant layer 7 is smaller and the strength is lowered, but also the deepest part of the concave part is positioned, and therefore the strength of laminate film 4 is lowered due to distortion and bending.

In the preferred embodiment, the deepest part in the concave portion at the side of sealant layer 7 at one boundary side (the upper side in FIG. 1) is not opposite to the deepest part in the concave portion at the side of sealant layer 7 at other boundary side (the lower side in FIG. 1). Hence, the strength decline of sealing part 8 at the position of the deepest part of the concave part is suppressed, and when sealing part 8 is exposed to an external force, damage or breakage can occur very rarely. At the same time, it is more effective to suppress occurrence of cracks in gas barrier layer 6 in the concave part. Or as shown in FIG. 3, it is preferable when sealing part 8 has at least two or more thin-wall parts 9a.

In thin-wall parts 9a, as compared with other positions in sealing part 8, the thickness of sealant layer 7 is smaller, and the seal strength is lowered, and in the manufacturing process, for example, when laminate film 4 is heated and fused in a state of holding the substance of core material 2 such as glass fiber or silica powder, there is a fear of occurrence of heat fusion failure in thin-wall parts 9a.

At the location of occurrence of heat fusion failure, resin is not present, and the gas invasion suppressing effect is lowered. As its countermeasure, at least two or more thin-wall parts 9a are provided, and it is possible to lessen the effects of gas and moisture invasion promoting effect into the inside of vacuum insulation material 1 due to heat fusion failure.

In particular, when core material 2 is made of glass fiber, the substance of core material 2 entrapped as debris in the heating and fusing process is heated and deformed, and through-holes are often formed in thin-wall parts 9a, and hence the effects of the present invention (of the preferred embodiment) are more prominent.

Also in thin-wall parts 9a, the strength of laminate film 4 is lower than in the peripheral parts, and concentration of load is anticipated when exposed to an external force. However, since plurality of thin-wall parts 9a are present, the load of the external force is dispersed, and cracks of thin-wall parts 9a and breakages of sealing part 8 can occur very rarely.

In the case of thin-wall parts 9a provided in a plurality, as compared with a case of a single thin-wall part 9a, if the thickness of sealant layer 7 is increased in thin-wall parts 9a, the same effects are obtained. Hence, the decline of strength or seal strength of laminate film 4 in thin-wall parts 9a can be lessened, and the risk of occurrence of cracks or breakages of sealing part 8 in thin-wall parts 9a can be lowered.

In the preferred embodiment, sealing parts 8 having thin-wall parts 9a are disposed at three sides, but may be provided at four sides around the whole circumference of sealing parts 8. The thickness of sealant layer 7 in each thin-wall part 9a may not be uniform.

In the preferred embodiment, as shown in FIG. 2, thin-wall parts 9a are intersecting orthogonally, but thin-wall parts 9a may not be always intersecting. The radius of curvature of the concave part at the boundary side positioned in each thin-wall part 9a may not be always the same, but the radius of curvature is not particularly specified as far as it is enough not to deteriorate the metal foil or film used as gas barrier layer 6.

Figure 7:
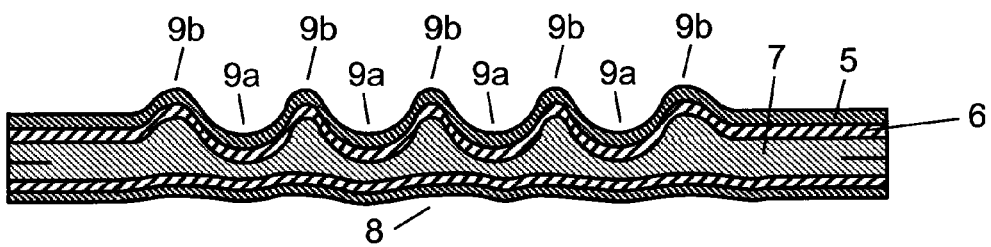
FIG. 7 is a sectional view showing a sealing part having a thin-wall part and a thick-wall part of the vacuum insulation material in any one of first to third exemplary embodiments of the present invention.

The interval of thin-wall parts 9a is not particularly specified, and the interval of concave parts of the boundary sides may not be always uniform as shown in FIG. 7.

In the preferred embodiment, the position of thin-wall parts 9a is not particularly specified, but if the concave part position of the boundary side is present in the boundary of sealing part 8 of laminate film 4 and other portion, the resin at one side of thin-wall part 9a is not heated sufficiently, and the fluidity of the resin is poor, and it is hard to form a thin portion, and it is not preferable.

Figure 8:
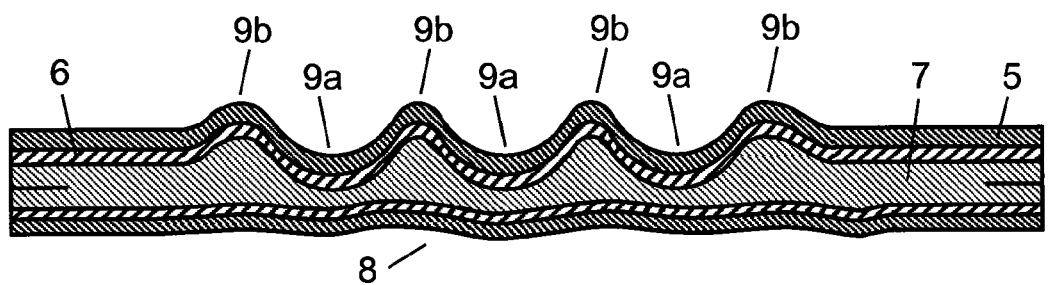
FIG. 8 is a sectional view showing a sealing part having a thin-wall part and a thick-wall part of a vacuum insulation material in a fourth exemplary embodiment of the present invention.
Figure 9:
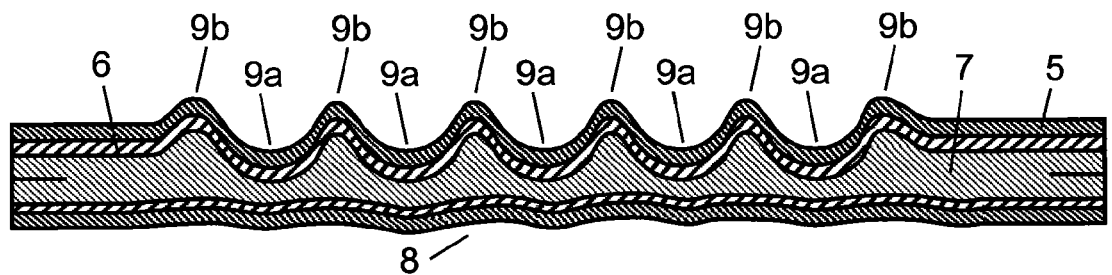
FIG. 9 is a sectional view showing a sealing part having a thin-wall part and a thick-wall part of a vacuum insulation material in a fifth exemplary embodiment of the present invention.
Figure 10:
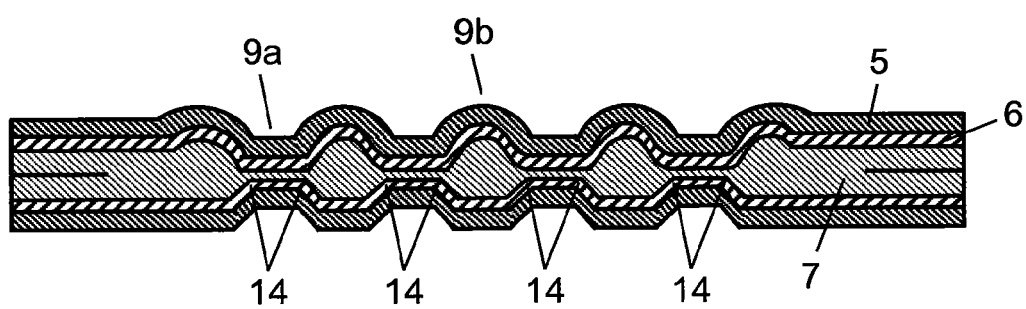
FIG. 10 is a sectional view showing a sealing part having a thin-wall part and a thick-wall part of a vacuum insulation material in comparative example 2.

The detailed shape and its effect of thin-wall parts 9a in the present invention are specifically described below by reference to the exemplary embodiments. FIG. 7 is a sectional view showing a sealing part having a thin-wall part and a thick-wall part of the vacuum insulation material in any one of first to third exemplary embodiments of the present invention. FIG. 8 is a sectional view showing a sealing part having a thin-wall part and a thick-wall part of a vacuum insulation material in a fourth exemplary embodiment of the present invention. FIG. 9 is a sectional view showing a sealing part having a thin-wall part and a thick-wall part of a vacuum insulation material in a fifth exemplary embodiment of the present invention. FIG. 10 is a sectional view showing a sealing part having a thin-wall part and a thick-wall part of a vacuum insulation material in comparative example 2.

First Exemplary Embodiment

In preferred embodiment 1, sealant layer 7 is a straight-chain low-density polyethylene film of thickness of 50 µm, gas barrier layer 6 is an aluminum foil of thickness of 6 µm and protective layer 5 is a nylon film of two layers of thickness of 15 µm and 25 µm, which were laminated to form laminate film 4. This laminate film 4, core material 2 composed of glass fiber, and adsorbent 3 composed of calcium oxide were combined to compose vacuum insulation material 1.

On the surrounding of laminate film 4 (on the outer circumference), there is sealing part 8 composed by fusing and adhering mutually sealant layers 7 of laminate film 4, and on three sides out of four sides of sealing part 8, thin-wall parts 9a of groove shape parallel to the peripheral edge are formed, and as shown in FIG. 7, four thin-wall parts 9a are disposed in parallel in a direction perpendicular to the peripheral edge. In FIG. 7, the radius of curvature in the deepest part of concave part of sealant layer 7 on the boundary side of upper side gas barrier layer 6 and sealant layer 7 corresponding to each think-wall part 9a was 1.5 mm, each crest height of undulation of the boundary side of upper side gas barrier layer 6 and sealant layer 7 was 0.2 mm, and the interval of the deepest parts of adjacent concave parts was 1.5 mm. In FIG. 7, the maximum crest height of the concave part of the other boundary side between lower side gas barrier layer 6 and sealant layer 7 was 0.05 mm.

At this time, supposing the seal width (the width of heating and fusing laminate films 4) to be 20 mm, and the thickness of the sealant layer of thin-wall part 9a to be 10 µm, the amount of atmospheric gas passing and invading through sealing part 8 from the end side of the peripheral edge of laminate film 4 of vacuum insulation material 1 was $9.5 \times 10^{-15}$ mol/m$^2$/s/Pa. In sealing part 8, occurrence of cracks in the aluminum foil was not recognized.

In the first exemplary embodiment, core material 2 is formed of glass fibers. In the case of core material 2 made of glass fibers, through-pinholes are likely to be formed in laminate film 4 from inside of vacuum insulation material 1 due to glass fibers.

Usually, to prevent occurrence of pinholes, it is believed effective to increase the thickness of sealant layer 7 in the innermost layer of laminate film 4 facing the inside of vacuum insulation material 1, but by increasing the thickness of the thickness of sealant layer 7, it was feared that the passage sectional area of the gas invasion path invading through sealing part 8 from the end face of the peripheral edge of outer sheath layer 4 might be increased.

In vacuum insulation material 1 of the first exemplary embodiment of preferred embodiment 1, since the invasion amount of gas can be controlled in thin-wall part 9a, if the thickness of sealant layer 7 is increased, it is effective to suppress the increase of gas and moisture invasion amount invading inside from sealing part 8 from the end face of the peripheral edge of laminate film 4.

In the first exemplary embodiment, the aluminum foil (metal foil) was used as the gas barrier layer for providing laminate film 4 with a gas barrier effect, and the metal foil, as compared with a gas barrier film formed by evaporating metal atoms or metal oxide molecules to a resin film, the gas barrier effect is higher, but the expansive property and the tracing property are poor, and cracks and pinholes are more likely to occur, and hence the effects by preferred embodiment 1 of the present invention may occur more prominently.

Second Exemplary Embodiment

In preferred embodiment 1, sealant layer 7 is a straight-chain low-density polyethylene film of thickness of 50 µm, gas barrier layer 6 is an aluminum foil of thickness of 6 µm, and protective layer 5 is a nylon film of two layers of thickness of 15 µm and 25 µm, which were laminated to form laminate film 4. This laminate film 4, core material 2 composed of glass fiber, and adsorbent 3 composed of calcium oxide were combined to compose vacuum insulation material 1.

On the surrounding of laminate film 4 (on the outer circumference), there is sealing part 8 composed by fusing and adhering mutually sealant layers 7 of laminate film 4, and on three sides out of four sides of sealing part 8, thin-wall parts 9a of groove shape parallel to the peripheral edge are formed, and as shown in FIG. 7, four thin-wall parts 9a are disposed in parallel in a direction perpendicular to the peripheral edge. In FIG. 7, the radius of curvature in the deepest part of concave part of sealant layer 7 on the boundary side of upper side gas barrier layer 6 and sealant layer 7 corresponding to each think-wall part 9a was 1.5 mm, each crest height of undulation of the boundary side of upper side gas barrier layer 6 and sealant layer 7 was 0.2 mm, and the interval of the deepest parts of adjacent concave parts was 1.5 mm. In FIG. 7, the maximum crest height of the concave part of the other boundary side between lower side gas barrier layer 6 and sealant layer 7 was 0.05 mm.

At this time, supposing the seal width (the width of heating and fusing laminate films 4) to be 20 mm, and the thickness of the sealant layer of thin-wall part 9a to be 5 µm, the amount of atmospheric gas passing and invading through sealing part 8 from the end side of the peripheral edge of laminate film 4 of vacuum insulation material 1 was $8.0 \times 10^{-15}$ mol/m$^2$/s/Pa. In sealing part 8, occurrence of cracks in the aluminum foil was not recognized.

Third Exemplary Embodiment

In preferred embodiment 1, sealant layer 7 is a straight-chain low-density polyethylene film of thickness of 50 µm, gas barrier layer 6 is an aluminum foil of thickness of 6 µm, and protective layer 5 is a nylon film of two layers of thickness of 15 µm and 25 µm, which were laminated to form laminate film 4. This laminate film 4, core material 2 composed of glass fiber, and adsorbent 3 composed of calcium oxide were combined to compose vacuum insulation material 1.

On the surrounding of laminate film 4 (on the outer circumference), there is sealing part 8 composed by fusing and adhering mutually sealant layers 7 of laminate film 4, and on three sides out of four sides of sealing part 8, thin-wall parts 9a of groove shape parallel to the peripheral edge are formed, and as shown in FIG. 7, four thin-wall parts 9a are disposed in parallel in a direction perpendicular to the peripheral edge. In FIG. 7, the radius of curvature in the deepest part of concave part of sealant layer 7 on the boundary side of upper side gas barrier layer 6 and sealant layer 7 corresponding to each think-wall part 9a was 1.5 mm, each crest height of undulation of the boundary side of upper side gas barrier layer 6 and sealant layer 7 was 0.2 mm, and the interval of the deepest parts of adjacent concave parts was 1.5 mm. In FIG. 7, the maximum crest height of the concave part of the other boundary side between lower side gas barrier layer 6 and sealant layer 7 was 0.05 mm.

At this time, supposing the seal width (the width of heating and fusing laminate films 4) to be 20 mm, and the thickness of the sealant layer of thin-wall part 9a to be 20 μm, the amount of atmospheric gas passing and invading through sealing part 8 from the end side of the peripheral edge of laminate film 4 of vacuum insulation material 1 was $1.0 \times 10^{-14}$ mol/m$^2$/s/Pa. In sealing part 8, occurrence of cracks in the aluminum foil was not recognized.

Fourth Exemplary Embodiment

In preferred embodiment 1, sealant layer 7 is a straight-chain low-density polyethylene film of thickness of 50 μm, gas barrier layer 6 is an aluminum foil of thickness of 6 μm, and protective layer 5 is a nylon film of two layers of thickness of 15 μm and 25 μm, which were laminated to form laminate film 4. This laminate film 4, core material 2 composed of glass fiber, and adsorbent 3 composed of calcium oxide sealed in an air permeable packaging material were combined to compose vacuum insulation material 1.

On the surrounding of laminate film 4 (on the outer circumference), there is sealing part 8 composed by fusing and adhering mutually sealant layers 7 of laminate film 4, and on three sides out of four sides of sealing part 8, thin-wall parts 9a of groove shape parallel to the peripheral edge are formed, and as shown in FIG. 8, three thin-wall parts 9a are disposed in parallel in a direction perpendicular to the peripheral edge. In FIG. 8, the radius of curvature in the deepest part of concave part of sealant layer 7 on the boundary side of upper side gas barrier layer 6 and sealant layer 7 corresponding to each think-wall part 9a was 1.5 mm, each crest height of undulation of the boundary side of upper side gas barrier layer 6 and sealant layer 7 was 0.2 mm, and the interval of the deepest parts of adjacent concave parts was 1.5 mm. In FIG. 8, the maximum crest height of the concave part of the other boundary side between lower side gas barrier layer 6 and sealant layer 7 was 0.05 mm.

At this time, supposing the seal width (the width of heating and fusing laminate films 4) to be 20 mm, and the thickness of the sealant layer of thin-wall part 9a to be 10 μm, the amount of atmospheric gas passing and invading through sealing part 8 from the end side of the peripheral edge of laminate film 4 of vacuum insulation material 1 was $1.0 \times 10^{14}$ mol/m$^2$/s/Pa. In sealing part 8, occurrence of cracks in the aluminum foil was not recognized.

Fifth Exemplary Embodiment

In preferred embodiment 1, sealant layer 7 is a straight-chain low-density polyethylene film of thickness of 50 μm, gas barrier layer 6 is an aluminum foil of thickness of 6 μm, and protective layer 5 is a nylon film of two layers of thickness of 15 μm and 25 μm, which were laminated to form laminate film 4. This laminate film 4, core material 2 composed of glass fiber, and adsorbent 3 composed of calcium oxide sealed in an air permeable packaging material were combined to compose vacuum insulation material 1.

On the surrounding of laminate film 4 (on the outer circumference), there is sealing part 8 composed by fusing and adhering mutually sealant layers 7 of laminate film 4, and on three sides out of four sides of sealing part 8, thin-wall parts 9a of groove shape parallel to the peripheral edge are formed, and as shown in FIG. 9, five thin-wall parts 9a are disposed in parallel in a direction perpendicular to the peripheral edge. In FIG. 9, the radius of curvature in the deepest part of concave part of sealant layer 7 on the boundary side of upper side gas barrier layer 6 and sealant layer 7 corresponding to each think-wall part 9a was 1.5 mm, each crest height of undulation of the boundary side of upper side gas barrier layer 6 and sealant layer 7 was 0.2 mm, and the interval of the deepest parts of adjacent concave parts was 1.5 mm. In FIG. 9, the maximum crest height of the concave part of the other boundary side between lower side gas barrier layer 6 and sealant layer 7 was 0.05 mm.

At this time, supposing the seal width (the width of heating and fusing laminate films 4) to be 20 mm, and the thickness of the sealant layer of thin-wall part 9a to be 10 μm, the amount of atmospheric gas passing and invading through sealing part 8 from the end side of the peripheral edge of laminate film 4 of vacuum insulation material 1 was $8.6 \times 10^{-15}$ mol/m$^2$/s/Pa. In sealing part 8, occurrence of cracks in the aluminum foil was not recognized.

Comparative Example 1

Sealant layer 7 is a straight-chain low-density polyethylene film of thickness of 50 μm, gas barrier layer 6 is an aluminum foil of thickness of 6 μm, and protective layer 5 is a nylon film of two layers of thickness of 15 μm and 25 μm, which were laminated to form laminate film 4. This laminate film 4, core material 2 composed of glass fiber, and adsorbent 3 composed of calcium oxide sealed in an air permeable packaging material were combined to compose a vacuum insulation material.

Using a flat plate jig for forming the sealing part, when the thickness of sealant layer 7 in sealing part 8 is about uniform, 100 μm, the amount of atmospheric gas passing and invading through sealing part 8 from the end side of the peripheral edge of laminate film 4 of vacuum insulation material 1 was $2.0 \times 10^{-14}$ mol/m$^2$/s/Pa. In sealing part 8, occurrence of cracks in the aluminum foil was not recognized.

Comparative Example 2

Sealant layer 7 is a straight-chain low-density polyethylene film of thickness of 50 μm, gas barrier layer 6 is an aluminum foil of thickness of 6 μm, and protective layer 5 is a nylon film of two layers of thickness of 15 μm and 25 μm, which were laminated to form laminate film 4. This laminate film 4, core material 2 composed of glass fiber, and adsorbent 3 composed of calcium oxide were combined to compose a vacuum insulation material.

For forming a sealing part, as shown in FIG. 10, a heating and compressing jig capable of forming a boundary surface was used. On the surrounding of laminate film 4 (on the outer circumference), there is sealing part 8 composed by fusing and adhering mutually sealant layers 7 of laminate film 4, and on three sides out of four sides of sealing part 8, thin-wall parts 9a of groove shape parallel to the peripheral edge are formed, and as shown in FIG. 10, four thin-wall parts 9a are disposed in parallel in a direction perpendicular to the peripheral edge. In the concave part of sealant layer 7 on the boundary side of gas barrier layer 6 and sealant layer 7 corresponding to each think-wall part 9a, sealant layer 7 had a nearly uniform thickness of 10 μm, corner parts 14 were formed on the boundary of thin-wall parts 9a.

At this time, supposing the seal width (the width of heating and fusing laminate films 4) to be 20 mm, the amount of atmospheric gas passing and invading through sealing part 8 from the end side of the peripheral edge of laminate film 4 of vacuum insulation material 1 was calculated, and the result was $9.5 \times 10^{-15}$ mol/m$^2$/s/Pa.

However, since corner parts 14 are formed on the boundary of thin-wall parts 9a, in corner parts 14, occurrence of cracks in the aluminum foil was recognized.

The exemplary embodiments and the comparative examples of the present invention are summarized in Table 1.

TABLE 1

| | Thickness of sealant layer in thin-wall part (μm) | Number of thin-wall parts (pieces) | Atmospheric gas permeability from sealing part section (mol/m²/s/Pa) | Deterioration of laminate film |
|---|---|---|---|---|
| (Exemplary embodiment 1) | 10 | 4 | $9.5 \times 10^{-15}$ | ○ |
| (Exemplary embodiment 2) | 5 | 4 | $8.0 \times 10^{-15}$ | ○ |
| (Exemplary embodiment 3) | 20 | 4 | $1.0 \times 10^{-14}$ | ○ |
| (Exemplary embodiment 4) | 10 | 3 | $1.0 \times 10^{-14}$ | ○ |
| (Exemplary embodiment 5) | 10 | 5 | $8.6 \times 10^{-15}$ | ○ |
| (Comparative example 1) | — | 0 | $2.0 \times 10^{-14}$ | ○ |
| (Comparative example 2) | 10 | 4 | $(9.5 \times 10^{-15})$ | x |

In Table 1, the deterioration of laminate film 4 was evaluated by the following criterion.
  ○: not deteriorated (increase of pinholes was not recognized in the aluminum foil positioned in the thin-wall parts).
  x: deteriorated (increase of pinholes was recognized in the aluminum foil positioned in the thin-wall parts).

From the results in Table 1, in vacuum insulation material 1 having thin-wall parts 9a shown in preferred embodiment 1, although there was a difference in the effect depending on the thickness of thin-wall parts 9a or the number of concave parts, a significant difference was always observed as compared with the vacuum insulation material not provided with thin-wall parts 9a. At the same time, the deterioration of laminate film 4 was not recognized.

As explained herein, vacuum insulation material 1 of the preferred embodiment includes two laminate films 4 of a rectangular shape cut in a same size, each having protective layer 5 on one side, sealant layer 7 on other side, and gas barrier layer 6 between protective layer 5 and sealant layer 7, core material 2 and adsorbent 3 sealed at a reduced pressure between two laminate films 4 disposed so that sealant layers 7 may be opposite to each other, and sealing part 8 having sealant layers 7 fused to each other near the peripheral edge of two laminate films 4 so as to surround the whole circumference of core material 2.

Further, at least sealing part 8 at one side of laminate film 4 out of sealing part 8 surrounding core material 2, or sealing part 8 positioned in one direction of core material 2 is heated and pressed from the outside to a temperature for fusing sealant layer 7, but not fusing protective layer 5 and gas barrier layer 6, from outside, so that a part of a resin for composing sealant layer 7 in a specific position to become thin-wall part 9a in a later process may be moved to the sealant layer 7 adjacent to sealant layer 7 at a specific position in a direction approaching the closest peripheral edge of the peripheral edges of laminate film 4, or may be moved to sealant layer 7 adjacent to sealant layer 7 at a specific position in a reverse direction to the approaching direction. As a result, when seen from a section being cut off on a plane perpendicular to the closest peripheral edge (see FIG. 1 or FIG. 3), as going from the closest peripheral edge to the inner circumference of laminate film 4, the interval between gas barrier layer 6 of laminate film 4 in one part of sealing part 8 and gas barrier layer 6 of other laminate film 4 of sealing part 8 is changed continuously. Further, in a portion changing in interval between gas barrier layer 6 of laminate film 4 in one part of sealing part 8 and gas barrier layer 6 of other laminate film 4 of sealing part 8, there are a plurality of thin-wall parts 9a and a plurality of thick-wall parts 9b. In thin-wall parts 9a, the thickness of sealant layer 7 between gas barrier layer 6 of laminate film 4 in one part of sealing part 8 and gas barrier layer 6 of other laminate film 4 of sealing part 8 is smaller than the total thickness of the thickness of sealant layers 7 between gas barrier layer 6 of one laminate film 4 not heated and fused between sealant layers 7 and gas barrier layer 6 of other laminate film 4 not heated and fused between sealant layers 7. In thick-wall parts 9b, at the inner circumferential side of thin-wall part 9a positioned at the innermost circumferential part out of the plurality of thin-wall parts 9a between two adjacent thin-wall parts 9a out of the plurality of thin-wall parts 9a, and at the outer circumferential side of thin-wall part 9a positioned at the outermost circumferential side of the plurality of thick-wall parts 9b, the thickness of sealant layer 7 between gas barrier layer 6 of one laminate film 4 is greater than the total thickness of the thickness of sealant layers 7 between gas barrier layer 6 of one laminate film 4 not heated and fused between sealant layers 7 and gas barrier layer 6 of other laminate film 4 not heated and fused between sealant layers 7. Further, all sealant layers 7 opposite to each other between two adjacent thin-wall parts 9a out of the plurality of thin-wall parts 9a are heated and fused.

In this configuration, sealing part 8 having thin-wall part 9a and thick-wall part 9b, when seen from a section being cut off on a plane perpendicular to the closest peripheral edge, as going from the closest peripheral edge to the inner circumference of laminate film 4, is changed in the interval continuously (smoothly) between gas barrier layer 6 of laminate film 4 in one part of sealing part 8 and gas barrier layer 6 of other laminate film 4 of sealing part 8. Therefore corners are not formed in layers 5, 6, 7 for composing laminate film 4. Further, in thin-wall part 9a of sealant layer 7, since there is no local portion for concentrating the external force, cracks of gas barrier layer 6 and breakages of the sealing part can hardly occur.

Figure 11:
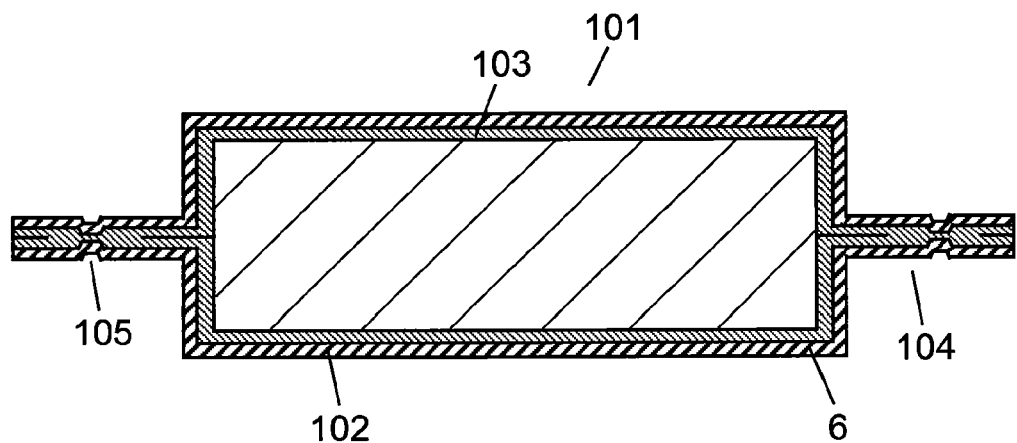
FIG. 11 is a sectional view of a conventional vacuum insulation material.

Moreover, since sealing part 8 having thin-wall part 9a and thick-wall part 9b is changed continuously (smoothly) in the thickness of sealant layer 7 also in thin-wall part 9a, the thinnest part of thin-wall part 9a can be narrowed. Hence, as compared with the conventional example shown in FIG. 11, in which thin-wall part 9a is uniform in thickness of sealant layer 7 of thin-wall part 9a in one position, it is easier to reduce the thickness of sealant layer 7 of the thinnest part of thin-wall part 9a.

Accordingly, sealing part 8 having thin-wall part 9a and thick-wall part 9b is reduced in the thickness of sealant layer 7 of the thinnest part of thin-wall part 9a, thin-wall parts 9a are provided at plural positions (two to five positions in the preferred embodiment), and opposite sealant layers 7 between two adjacent thin-wall parts 9a out of the plurality of thin-wall parts 9a are all heated and fused. As a result, the passing area of gas and moisture invading from the end side of the peripheral edge of laminate film 4 is reduced, and the passing resistance of gas and moisture is increased, and the passing speed of gas and moisture is decreased, and thereby the amount of passing gas and moisture is suppressed at gradual time intervals, and an excellent adiabatic performance can be maintained for a long period.

The adhering force of sealing part 8 becomes stronger as the thickness of sealant layer 7 is increased generally along with the thickness of sealant layer 7, and thick-wall parts 9b are formed between two adjacent thin-wall parts 9a, and between the inner circumferential side of thin-wall part 9a positioned at the innermost circumferential side and the outer circumferential side of thin-wall part 9a positioned at the outermost circumferential side, and therefore the thickness of sealant layer 7 is increased or decreased smoothly from the thinnest part of thin-wall part 9a to the thickest part of thick-wall part 9b. In addition, opposite sealant layers 7 between two adjacent thin-wall parts 9a out of the plurality of thin-wall parts 9a are all heated and fused, and hence sealing part 8 having thin-wall part 9a is hardly peeled by an external force either from the inner circumferential side or from the outer circumferential side.

In sealing part 8 having thin-wall part 9a and thick-wall part 9b, moreover, thin-wall parts 9a are provided at plural positions (two to five positions in the preferred embodiment), but by increasing and decreasing the thickness of sealant layer 7 continuously (smoothly) also in thin-wall parts 9a, the thinnest part of thin-wall parts 9a is narrowed, and effects of heat bridge can be decreased.

Also in thin-wall parts 9a, the strength of laminate film 4 is lower than in the peripheral parts, and concentration of load may be considered when an external force is applied, but since thin-wall parts 9a are provided at plural positions, the load of the external force is diffused, and cracks in thin-wall parts 9a and breakages of sealing part 8 can very hardly occur.

In the case of a plurality of thin-wall parts 9a, as compared with a case of one thin-wall part 9a, if the thickness of sealant layer 7 is increased in thin-wall parts 9a, the same effects are obtained, and decline of the strength of laminate film 4 or the seal strength in thin-wall parts 9a is lessened, and the risk of cracks in thin-wall parts 9a and breakages of sealing part 8 can be lowered.

Further, when two laminate films 4 both have metal foil layers such as aluminum foils as gas barrier layer 6, approaching of the distance between two layers of metal foils in sealing part 8 is lessened, and the increase of thermal conductivity by heat leak can occur very rarely.

From such point of view, the number of thin-wall parts 9a is desired to be more, and usually four to six pieces are desired, though variable depending on the width of sealing part 8.

When core material 2 is a glass fiber, through-pinholes are likely to be formed from the inside of vacuum insulation material 1 to laminate film 4 due to the glass fiber.

Usually, as a measure for preventing occurrence of pinholes, it is believed effective to increase the thickness of sealant layer 7 at the innermost layer of laminate film 4 facing the inside of vacuum insulation material 1, but by increasing the thickness of sealant layer 7, it may be feared that the area of the gas invasion path at the section of sealing part 8 may be widened.

In vacuum insulation material 1 in the preferred embodiment of the present invention, since the gas invasion amount can be controlled in thin-wall parts 9a, if the thickness of sealant layer 7 is increased, it is possible to suppress the increase of gas and moisture invading into the inside of vacuum insulation material 1 through sealing part 8 from the end surface of the peripheral edge of laminate film 4.

According, if thin-wall part 9a reduced in thickness in a part of sealant layer 7 is formed in sealing part 8, in thin-wall part 9a of sealant layer 7 provided in sealing part 8 and in its vicinity, cracks and breakages of sealing part 8 can very hardly occur. Further, it is easy to reduce the thickness of the thinnest part of thin-wall part 9a, and sealing part 8 having thin-wall part 9a is hardly peeled by an external force, and there is a very slight effect of heat bridge, so that vacuum insulation material 1 maintaining an excellent adiabatic performance for a long period can be presented.

In addition, since the invading amount of gas from the end surface of laminate film 4 by passing through sealant layer 7 of sealing part 8 can be suppressed, if the width of sealing part 8 to be formed on the peripheral edge of laminate film 4 is shortened to an extent to be canceled with the increment of the passing resistance of sealing part 8 by forming of thin-wall parts 9a, the adiabatic performance is not lowered. Hence, the dimension of laminate film 4 to be used in vacuum insulation material 1 having core material 2 of same size can be decreased, and it is effective to save the material cost.

After formation of sealing part 8, when vacuum insulation material 1 is formed in a small size by cutting off laminate film 4 at the outer circumferential side of sealing part 8, it is preferred to cut off so as to leave thick-wall part 9b at the outer circumferential side of thin-wall part 9a positioned at the outermost circumferential side.

In the vacuum insulation material of the preferred embodiment, out of sealing parts 8 surrounding core material 2, at least sealing part 8 at one side of laminate film 4 or sealing part 8 positioned in one direction of core material 2 is, when seen from a section being cut off on a plane perpendicular to the closest peripheral edge (see FIG. 1 or FIG. 3), as going from the closest peripheral edge to the inner circumference of laminate film 4, is relatively large in the compression width of laminate film 4 compressed in s thickness direction at plural positions. This material is pressed so as to be changed gradually in the compression width of the portion of laminate film 4 compressed in a thickness direction, and is heated to a temperature for fusing sealant layer 7, but not fusing protective layer 5 and gas barrier layer 6, in a specified range, not only the portion compressed by heating and pressing, but also near the compressed portion. As a result, a part of the resin for composing sealant layer 7 of the portion of laminate film 4 compressed in a thickness direction is moved to sealant layer 7 in a portion of laminate film 4 not compressed in a thickness direction.

Further, when seen from a section being cut off on a plane perpendicular to the closest peripheral edge of laminate film 4 (see FIG. 1 or FIG. 3), as going from the closest peripheral edge to the inner circumference of laminate film 4, on the way, the compression width of laminate film 4 compressed in a thickness direction is relatively increased at plural positions. Laminate film 4 is pressed from the side of protective layer 5 to the side of sealant layer 7, so that the compression width of the portion to be compressed in a thickness direction may be changed continuously. At the same time, the material is heated to a temperature for fusing sealant layer 7, but not fusing protective layer 5 and gas barrier layer 6, in a specified range, not only the compressed portion, but also near the compressed portion. As a result, a part of the resin for composing sealant layer 7 of the portion of laminate film 4 compressed in a thickness direction is moved to sealant layer 7 in a portion of laminate film 4 not compressed in a thickness direction. In this case, when seen from a section being cut off on a plane perpendicular to the closest peripheral edge (see FIG. 1 or FIG. 3), as going from the closest peripheral edge to the inner circumference of laminate film 4, the interval of gas barrier layers 6 of both laminate films 4 of sealing part 8 is changed continuously. In the continuously changing portion of the interval of gas barrier layers 6, a plurality of thin-wall parts 9a are formed. Moreover, thick-wall part 9b is formed between the inner circumferential side of thin-wall part 9a positioned at the innermost circumferential side out of plural thin-wall parts 9a between two adjacent thin-wall parts 9a out of the plurality of thin-wall parts 9a, and the outer circumference side of thin-wall part 9a positioned at the outermost circumferential side out of the plurality of thin-wall parts 9a. Further, out of the plurality of thin-wall parts 9a, opposite sealant layers 7 between two adjacent thin-wall parts 9a are all heated and fused.

Further, when seen from a section being cut off on a plane perpendicular to the closest peripheral edge (see FIG. 1 or FIG. 3), as going from the closest peripheral edge to the inner circumference of laminate film 4, laminate film 4 is relatively thin at plural positions, and the thickness of laminate film 4 is changed continuously. In the relatively thin portion of laminate film 4, only sealant layer 7 is thin out of protective layer 5, gas barrier layer 6, and sealant layer 7 for composing laminate film 4, and in the relatively thick portion of laminate film 4, only sealant layer 7 is thick out of protective layer 5, gas barrier layer 6, and sealant layer 7 for composing laminate film 4. In the case opposite sealant layer 7 of two adjacent thin-wall parts 9a out of the plurality of thin-wall parts 9a are all heated and fused, when seen from a section being cut off on a plane perpendicular to the closest peripheral edge of laminate film 4 (see FIG. 1 or FIG. 3), as going from the closest peripheral edge to the inner circumference of laminate film 4, on the way, laminate film 4 is relatively large in the compression width being compressed in a thickness direction at plural positions. Herein, in order that laminate film 4 may be changed continuously in the compression width of the portion compressed in a thickness direction, pressure is applied from the side of protective layer 5 to the side of sealant layer 7. At the same time, the material is heated to a temperature for fusing sealant layer 7, but not fusing protective layer 5 and gas barrier layer 6, in a specified range, not only the compressed portion, but also near the compressed portion, and a part of the resin for composing sealant layer 7 of the portion of laminate film 4 compressed in a thickness direction is estimated to be moved to sealant layer 7 in a portion of laminate film 4 not compressed in a thickness direction.

In the vacuum insulation material of the preferred embodiment, sealing part 8 at one side of at least laminate film 4 out of sealing parts 8 surrounding core material 2 or sealing part 8 positioned in one direction of core material 2 is pressed so that the pressing force is changed continuously while the pressing force of heating and pressing may be relatively strong at plural positions on the way, going from the closet peripheral edge to the inner circumference of laminate film 4. The material is heated to a temperature for fusing sealant layer 7, but not fusing protective layer 5 and gas barrier layer 6, in a specified range, not only the compressed portion in the heating and pressing process, but also near the compressed portion. As a result, a part of the resin for composing sealant layer 7 of the portion relatively stronger in the pressing force is moved to sealant layer 7 in a portion relatively weak in pressing force or a portion not to be pressed being adjacent to the pressed portion.

In a direction from the closest peripheral edge out of the peripheral edge of laminate film 4 toward the inner circumference of laminate film 4, the material is pressed so that the pressing force is changed continuously while the pressing force may be relatively strong at plural positions on the way, and is heated to a temperature for fusing sealant layer 7, but not fusing protective layer 5 and gas barrier layer 6, in a specified range, not only the compressed portion, but also near the compressed portion. As a result, when a part of the resin for composing sealant layer 7 of the portion relatively stronger in the pressing force is moved to sealant layer 7 in a portion relatively weak in pressing force or a portion not to be pressed being adjacent to the pressed portion, if seen from a section being cut off on a plane perpendicular to the closest peripheral edge (see FIG. 1 or FIG. 3), as going from the closest peripheral edge to the inner circumference of laminate film 4, the interval of gas barrier layers 6 of both laminate films 4 of sealing part 8 is changed continuously. In this continuously changing portion of the interval of gas barrier layers 6, a plurality of thin-wall parts 9a and thick-wall parts 9b are formed. Thick-wall parts 9b are formed between two adjacent thin-wall parts 9a out of the plurality of thin-wall parts 9a, at the inner circumferential side of thin-wall part 9a positioned at the innermost circumferential side of the plurality of thin-wall parts 9a, and at the outer circumferential side of thin-wall part 9a positioned at the outermost circumferential side of the plurality of thin-wall parts 9a. Out of the plurality of thin-wall parts 9a, opposite sealant layers 7 between two adjacent thin-wall parts 9a are all heated and fused.

Further, when seen from a section being cut off on a plane perpendicular to the closest peripheral edge (see FIG. 1 or FIG. 3), as going from the closest peripheral edge to the inner circumference of laminate film 4, laminate film 4 is relatively thin at plural positions, and the thickness of laminate film 4 is changed continuously. In the relatively thin portion of laminate film 4, only sealant layer 7 is thin out of protective layer 5, gas barrier layer 6, and sealant layer 7 for composing laminate film 4, and in the relatively thick portion of laminate film 4, only sealant layer 7 is thick out of protective layer 5, gas barrier layer 6, and sealant layer 7 for composing laminate film 4. In the case opposite sealant layer 7 of two adjacent thin-wall parts 9a out of the plurality of thin-wall parts 9a are all heated and fused, in a direction from the closest peripheral edge of the peripheral edge of laminate film 4 to the inner circumference of laminate film 4, on the way, pressure is applied to vary the pressing force continuously so that the pressing force may be relatively stronger at plural positions. Along with pressing, by heating to a temperature for fusing sealant layer 7, but not fusing protective layer 5 and gas barrier layer 6, in a specified range, not only the pressed portion, but also near the pressed portion, a part of the resin for composing sealant layer 7 of the portion relatively stronger in the pressing force is estimated to be moved to sealant layer 7 in a portion of relatively weak in pressing force or a portion not pressed being adjacent to the pressed portion.

In the vacuum insulation material of the preferred embodiment, near the thinnest portion of the thickness of sealant layer 7 in thin-wall part 9a, the decrement width of the thickness of sealant layer 7 becomes smaller as the thickness of sealant layer 7 approaches the thinnest portion.

Near the thinnest portion of the thickness of sealant layer 7 in thin-wall part 9a, when the decrement width of the thickness of sealant layer 7 becomes smaller as the thickness of sealant layer 7 approaches the thinnest portion, it is considered easier to move a part of the resin for composing sealant layer 7 in the portion of laminate film 4 compressed in a thickness direction to sealant layer 7 in the portion of adjacent laminate film 4 not compressed in a thickness direction. In other words, it is considered easy to move a part of the resin for composing sealant layer 7 in the portion relatively strong in pressing force to a portion relative weak in pressing force or to sealant layer 7 in the portion not pressed being adjacent to the pressed portion, and it is easy to reduce the thickness of the thinnest part of thin-wall part 9a. Moreover, as the thinnest part of thin-wall part 9a becomes thinner, the passing area of gas and moisture invading from the end side of the peripheral edge of laminate film 4 is reduced, the passing resistance of gas and moisture is increased, and the passing speed of gas and moisture is decreased, and thereby the amount of passing gas and moisture is suppressed at gradual time intervals, and an excellent adiabatic performance can be maintained for a long period.

Moreover, near the thinnest portion of the thickness of sealant layer 7 in thin-wall part 9a, when the decrement width of the thickness of sealant layer 7 becomes smaller as the thickness of sealant layer 7 approaches the thinnest portion, the interval of gas barrier layer 6 of one laminate film 4 of sealing part 8 having thin-wall part 9a and thick-wall part 9b and gas barrier layer 6 of other laminate film 4 is likely to be changed smoothly. As the interval of two gas barrier layers 6 is changed smoothly, external forces are not concentrated locally, and cracks of gas barrier layer 6 and breakages of sealing part 8 can occur very hardly.

Moreover, near the thinnest portion of the thickness of sealant layer 7 in thin-wall part 9a, when the decrement width of the thickness of sealant layer 7 becomes smaller as the thickness of sealant layer 7 approaches the thinnest portion, the width of the thinnest part of thin-wall part 9a can be narrowed, and the thinnest part of thin-wall part 9a is reduce in width, and effects of heat bridge can be eliminated.

Further, in thin-wall part 9a of the vacuum insulation material of the preferred embodiment, when seen from a section being cut off on a plane perpendicular to the closest peripheral edge (see FIG. 1 or FIG. 3), the surface of one laminate film 4 is concaved in an arc shape (including a nearly arc shape) to the side of sealant layer 7 in the portion corresponding to the thinnest portion of thin-wall part 9a.

When the surface of at least one laminate film 4 is concaved in an arc shape (including a nearly arc shape) to the side of sealant layer 7 in the portion corresponding to the thinnest portion of thin-wall part 9a, in the vicinity of the thinnest portion of the thickness of sealant layer 7 in thin-wall part 9a, the thickness of sealant layer 7 becomes smaller in the thickness decrement width of sealant layer 7 as approaching the thinnest portion. As a result, it is easy to move a part of the resin for composing sealant layer 7 in the portion of laminate film 4 compressed in a thickness direction to sealant layer 7 in the portion of adjacent laminate film 4 not compressed in the thickness direction. In other words, it is easy to move a part of the resin for composing sealant layer 7 in the portion relatively stronger in the pressing force to sealant layer 7 in a portion relatively weak in pressing force or in an adjacent portion not compressed, and it is easier to reduce the thickness of the thinnest part of thin-wall part 9a. As the thinnest part of thin-wall part 9a become thinner, the passing area of gas and moisture invading from the end side of the peripheral edge of laminate film 4 is reduced, the passing resistance of gas and moisture is increased, and the passing speed of gas and moisture is decreased, and thereby the amount of passing gas and moisture is suppressed at gradual time intervals, and an excellent adiabatic performance can be maintained for a long period.

Moreover, when the surface of at least one laminate film 4 is concaved in an arc shape (including a nearly arc shape) to the side of sealant layer 7 in the portion corresponding to the thinnest portion of thin-wall part 9a, the change in the interval is smooth between gas barrier layer 6 of one laminate film 4 of sealing part 8 having thin-wall part 9a and thick-wall part 9b and gas barrier layer 6 of other laminate film, external forces are not concentrated locally, and cracks of gas barrier layer 6 and breakages of sealing part 8 can occur very hardly.

Further, when the surface of at least one laminate film 4 is concaved in an arc shape (including a nearly arc shape) to the side of sealant layer 7 in the portion corresponding to the thinnest portion of thin-wall part 9a, the thinnest part of thin-wall part 9a is narrow, and effects of heat bridge can be suppressed.

In the vacuum insulation material of the preferred embodiment, in sealing part 8 having thin-wall part 9a and thick-wall part 9b, the convexo-concave shape of the surface of one laminate film 4 is different from the convexo-concave shape of the surface of other laminate film 4, and it is not necessary to form uniformly between the convexo-concave shape of the surface of one laminate film 4 and the convexo-concave shape of the surface of other laminate film 4. For example, when the convexo-concave undulations of the surface of one laminate film 4 are larger than the convexo-concave undulations of the surface of other laminate film 4, the decline of strength of other laminate film by forming of convexo-concave shape of one surface is smaller than the decline of strength of one laminate film 4. In sealing part 8 having thin-wall part 9a and thick-wall part 9b, laminate film 4 relatively smaller in decline of strength is maintained in the rigidity in a form of supporting laminate film 4 relatively larger in decline of strength, and when exposed to an external force, cracks and breakage of sealing part 8 can occur very rarely.

In the vacuum insulation material of the preferred embodiment, in thin-wall part 9a, the surface of one laminate film 4 is concaved to the side of sealant layer 7 in the portion corresponding to the thinnest portion of thin-wall part 9a, and the surface of other laminate film 4 corresponding to the thinnest portion of thin-wall part 9a is not concaved to the side of sealant layer 7. As a result, the change in the interval is small between gas barrier layer 6 of one laminate film 4 at thin-wall part 9a and gas barrier layer 6 of other laminate film 4, and cracks of gas barrier layer 6 and breakages of laminate film 4 in thin-wall part 9a can occur very hardly.

Suppose, herein, to form thin-wall part 9a and thick-wall part 9b, by heating and pressing by using upper and lower heating and compressing jigs 10, 13, in a manner of pinching laminate film 4 by using a heating and compressing jig having an undulated surface (an upper heating and compressing jig having protrusions 11 on a pressing surface) and a heating and compressing jig having a flat surface (lower heating and compressing jig 13 having silicone rubber sheet 12 on a pressing surface). In particular, when the heating and compressing jig having a flat surface (lower heating and compressing jig 13 having silicone rubber sheet 12 on a pressing surface) is deformed elastically, swelling occurs at the opposite side of the upper side of sealant layer 7 in the portion corresponding to the thinnest portion of thin-wall part 9a on the surface of laminate film 4 of the side facing the heating and compressing jig having a flat surface (lower heating and compressing jig 13 having silicone rubber sheet 12 on a pressing surface). In this case, too, the surface of other laminate film 4 corresponds to the portion not concaved to the side of sealant layer 7 in the portion corresponding to the thinnest portion of thin-wall part 9a.

Generally, gas barrier layer 6 of laminate film 4 of vacuum insulation material 1 is composed of metal foil such as aluminum foil, or metal evaporation layer such as aluminum evaporation layer, but as compared between a metal foil and a metal evaporation layer, the meal foil is relatively thicker, and is likely to form cracks when deformed. Accordingly, if two laminate films 4 are different in bulging height of undulation shape on the surface, it is preferred to use a metal foil in gas barrier layer 6 of laminate film 4 of the smaller bulging height of undulation shape on the surface.

Also between a metal foil and a metal evaporation layer, relatively, the metal evaporation layer is thinner and smaller in gas barrier effect deterioration due to deformation. Accordingly, if two laminate films 4 are different in bulging height of undulation shape on the surface, a metal evaporation layer may be used in gas barrier layer 6 of laminate film 4 of the larger bulging height of undulation shape on the surface.

The metal evaporation layer is to be used on the surface of the resin film as a base material, and when the metal evaporation layer is provided at the side protective layer 5 of the resin film, as compared with the case of having the metal evaporation layer at the side surface of sealant layer 7 of the resin film, it is more resistant to adverse effects when a part of the resin for composing sealant layer 7 at the time of forming of thin-wall part 9a. When the metal evaporation layer is provided at the side surface of sealant layer 7 of the resin film, as compared with the case of having the metal evaporation layer at the side surface of protective layer 5 of the resin film, the interval of the metal evaporation layer of one laminate film 4 in the sealing part and the metal evaporation layer of other laminate film 4 is narrower, the passing area of gas and moisture invading from the end side of the peripheral edge of laminate film 4 is reduced, the passing resistance of gas and moisture is increased, and the passing speed of gas and moisture is decreased, and thereby the amount of passing gas and moisture is suppressed at gradual time intervals, and an excellent adiabatic performance can be maintained for a long period.

Between a metal foil and a metal evaporation layer, the metal foil is relatively thicker, and is excellent in the gas barrier effect, and by using a metal foil in gas barrier layer 6 of at least one laminate film 4 of two laminate films 4, an excellent adiabatic performance can be maintained for a long period.

Also between a metal foil and a metal evaporation layer, the metal foil is excellent in the gas barrier effect, but the metal evaporation layer is smaller in gas barrier effect deterioration after deformation, and heat is hardly transmitted through the gas barrier layer. Therefore, thin-wall part 9a becomes a heat bridge, the metal evaporation film may be used in gas barrier layer 6 of at least one laminate film 4 of two laminate films 4, when desired to suppress conduction of heat to the gas barrier layer of laminate film 4 of other heat conduction surface from the gas barrier layer of laminate film 4 of one heat conduction surface of vacuum insulation material 1, or when used in an application not necessary to maintain the adiabatic performance for a long period, or when sealing adsorbent 3 capable of suppressing elevation of internal pressure by adsorbing the invading air, at a reduced pressure, between laminate films 4 together with core material 2.

Alternatively, the metal foil may be used in gas barrier layer 6 of one laminate film 4 out of two laminate films 4, and the metal evaporation layer may be used in gas barrier layer 6 of other laminate film 4.

In this case, as compared with the case of using the metal foil in both gas barrier layers 6 of two laminate film 4, thin-wall part 9a becomes a heat bridge, it is effective to suppress conduction of heat to gas barrier layer 6 of laminate film 4 of other heat conduction surface from gas barrier layer 6 of laminate film 4 of one heat conduction surface of vacuum insulation material 1.

Incidentally, if two laminate films 4 are different in bulging height of undulation shape on the surface, a metal foil may be used in gas barrier layer 6 of laminate film 4 of the smaller bulging height of undulation shape on the surface, and a metal evaporation layer may be used in the gas barrier layer of laminate film 4 of the larger bulging height of undulation shape on the surface.

If there is a temperature difference in the ambient atmosphere of two laminate films 4, and the gas barrier effect deteriorates in laminate film 4 using a metal evaporation layer in gas barrier layer 6 of the high temperature, it is preferred to use a metal foil in gas barrier layer 6 of laminate film 4 of a relatively high temperature, and use a metal evaporation layer in gas barrier layer 6 of laminate film 4 of a relatively low temperature.

When vacuum insulation material 1 is bent and used, it is desired to use a metal evaporation layer in gas barrier layer 6 of laminate film 4 at the side relative pulled strongly by bending, and use a metal foil in gas barrier layer 6 of laminate film 4 at the opposite side.

When adhering vacuum insulation material 1 to a wall surface having a gas barrier effect, invasion of air from the side adhered to the wall surface having a gas barrier effect is low in possibility, and it is preferred to use a metal evaporation layer in gas barrier layer 6 of laminate film 4 at the side adhered to the wall surface having a gas barrier effect, and use a metal foil in gas barrier layer 6 of laminate film 4 at the opposite side.

Vacuum insulation material 1 of the preferred embodiment shown in FIG. 2 includes thin-wall part 9a and thick-wall part 9b on sealing parts 8 of remaining sides excluding one side of laminate film 4 out of sealing parts 8 surrounding core material 2.

In this vacuum insulation material 1, one side of laminate film 4 is left over as an opening part for inserting core material 2, and sealing parts 8 having thin-wall part 9a and thick-wall part 9b are formed on the remaining sides, and laminate film 4 is fabricated in a bag shape. From this opening part, core material 2 is put into the bag of laminate film 4, and when the bag of laminate film 4 is evacuated, and sealant layers near the periphery of the remaining one side not fused because of the opening part of the bag of laminate film 4 is fused and sealed.

In this case, sealing of one side corresponding to the opening part of the bag of laminate film 4 must be conducted in a state of a reduced pressure in the bag of laminate film 4, and sealing is often performed in a reduced pressure space, and there is a stronger restriction than sealing of the remaining sides excluding the one side of laminate film 4 conducted in an atmospheric environment. Accordingly, sealing part 8 at one side corresponding to the opening part of the bag of laminate film 4 is processed in a conventional method, and sealing parts 8 of other sides excluding the one side of laminate film 4 conducted in an atmospheric environment are sealing parts 8 having thin-wall part 9a and thick-wall part 9b, so that the adiabatic performance can be enhanced in consideration of the working efficiency, the manufacturing cost, and the sealing facility.

Vacuum insulation material 1 of the preferred embodiment shown in FIG. 2 includes thin-wall part 9a and thick-wall part 9b on the remaining sealing parts 8 excluding sealing part 8 positioned in one direction of core material 2 out of sealing parts 8 surrounding core material 2.

This vacuum insulation material 1 is sealed finally after sealing part 8 positioned in one direction of core material 2 is disposed in core material 2, and the remaining sealing parts 8 excluding sealing part 8 positioned in one direction of core material 2 are formed like a bag by forming sealing parts 8 having thin-wall part 9a and thick-wall part 9b before core material 2 is disposed, and thereby laminate film 4 is manufactured. From the opening part, core material 2 is put into the bag of laminate film 4, and the bag of laminate film 4 is evacuated, and sealing part 8 positioned in one direction of core material 2 not fused, corresponding to the opening part of the bag of laminate film 4 is sealed to complete the process.

In this case, sealing of sealing part 8 positioned in one direction of core material 2 corresponding to the opening part of the bag of laminate film 4 must be done in an evacuated state in the bag of laminate film 4, and sealing is often carried out in a reduced-pressure space, and there is a stronger restriction than sealing of the remaining sealing parts 8 except for sealing part 8 positioned in one direction of core material 2 conducted in an atmospheric environment. Accordingly, sealing of sealing part 8 positioned in one direction of core material 2 corresponding to the opening part of the bag of laminate film 4 is processed in a conventional method, and the remaining sealing parts 8 to be processed in at atmospheric environment are sealing parts 8 having thin-wall part 9a and thick-wall part 9b, so that the adiabatic performance can be enhanced in consideration of the working efficiency, the manufacturing cost, and the sealing facility.

In vacuum insulation material 1 of the preferred embodiment shown in FIG. 5, sealing part 8 having thin-wall part 9a and thick-wall part 9b surrounds the whole circumference of core material 2. Hence, since sealing part 8 having thin-wall part 9a and thick-wall part 9b surrounds the whole circumference of core material 2 around 360 degrees, as compared with since sealing part 8 having thin-wall part 9a and thick-wall part 9b not surrounding the whole circumference of core material 2 around 360 degrees, an excellent adiabatic performance may be exhibited for a longer period.

In vacuum insulation material 1 of the preferred embodiment shown in FIG. 5, sealing part 8 composed of sealant layer of a uniform thickness not having thin-wall part 9a and thick-wall part 9b is formed, by using an ordinary flat plate jig, on the peripheral edge of two laminate films 4, and sealing part 8 is heated and compressed by upper and lower heating and compressing jigs 10, 13, and thin-wall part 9a and thick-wall part 9b are formed on the peripheral edge of laminate film 4 as shown in FIG. 5. Instead, two laminate films 4 may be disposed so that sealant layers 7 may be opposite to each other, and two laminate films 4 may be held, heated and compressed by upper side heating and compressing jig 10 of metal material having a heater, and lower side heating and compressing jig 13 having silicone rubber sheet 12 and a heater, and thereby the three sides around the circumference of laminate film 4 may be heated and fused, and a bag shape may be formed. Afterwards, by inserting core material 2 and adsorbent 3 into the bag, the bag is evacuated, and sealing part 8 having thin-wall part 9a and thick-wall part 9b is formed in the opening part of the bag of laminate film 4, and is sealed, so that vacuum insulation material 1 may be obtained. Alternatively, by using a conventional flat plate jig only on the opening part of the bag of laminate film 4, sealing part 8 composed of sealant layer of a uniform thickness not having thin-wall part 9a and thick-wall part 9b may be formed, and sealing part 8 may be heated and compressed by upper and lower heating and compressing jigs 10, 13, so that thin-wall part 9a and thick-wall part 9b may be formed on the peripheral edge of laminate film 4 as shown in FIG. 5.

In vacuum insulation material 1 of the preferred embodiment shown in FIG. 5, the whole circumference of core material 2 is surrounded by linked thin-wall part 9a. As a result, as compared with core material 2 of which whole circumference is surrounded by non-linked thin-wall part 9a, the reliability of sealing is higher, and an excellent adiabatic performance may be exhibited for a longer period.

In vacuum insulation material 1 of the preferred embodiment shown in FIG. 2, the shape of laminate film 4 is square (rectangular). Accordingly, sealing part 8 having thin-wall part 9a and thick-wall part 9b is provided near the peripheral edge of three sides of laminate film 4, three sides of core material 2 are enclosed by linked thin-wall part 9a.

In this vacuum insulation material 1, sealing part 8 having thin-wall part 9a and thick-wall part 9b is formed near the peripheral edge of three sides of square (rectangular) laminate film 4, and bag-shaped laminate film 4 having an opening part is manufactured. From the opening part, core material 2 is put into the bag of laminate film 4, and the bag of laminate film 4 is evacuated, and it is obtained when sealant layers 7 near the peripheral edge of one remaining side not fused for forming the opening part of the bag of laminate film 4 are mutually fused and sealed. When forming sealing part 8 having thin-wall part 9a and thick-wall part 9b near the peripheral edge of three sides, sealing part 8 is formed so that the three sides of core material 2 may be later surrounded by linked thin-wall part 9a.

In this case, sealing of one side corresponding to the opening part of the bag of laminate film 4 must be done in an evacuated state in the bag of laminate film 4, and sealing is often carried out in a reduced-pressure space, and there is a stronger restriction than sealing of three sides of laminate film 4 conducted in an atmospheric environment. Accordingly, sealing part 8 of one side corresponding to the opening part of the bag of laminate film 4 is processed in a conventional method, and three sides of sealing part 8 of laminate film 4 to be processed in at atmospheric environment are sealing parts 8 having thin-wall part 9a and thick-wall part 9b, so that the adiabatic performance can be enhanced in consideration of the working efficiency, the manufacturing cost, and the sealing facility.

Since three sides of core material 2 are surrounded by linked thin-wall part 9a, the reliability of sealing is higher as compared with core material 2 of which three sides are surrounded by non-linked thin-wall part 9a, and an excellent adiabatic performance may be exhibited for a longer period.

Thin-wall part 9a of vacuum insulation material 1 of the preferred embodiment shown in FIG. 2 is linked to from one side to other side out of two adjacent sides close to the side near sealing part 8 having thin-wall part 9a and thick-wall part 9b. Considering fluctuations in the sealing position in the sealing work, the sealing reliability is higher when thin-wall part 9a is linked to from one side to other side out of two adjacent sides close to the side near sealing part 8 having thin-wall part 9a and thick-wall part 9b.

The shape of laminate film 4 of the preferred embodiment is polygonal having three or more angles, and thin-wall part 9a is linked to from one side to other side out of two adjacent sides close to the side near sealing part 8 having thin-wall part 9a and thick-wall part 9b. Considering fluctuations in the sealing position in the sealing work, the sealing reliability is higher when thin-wall part 9a is linked to from one side to other side out of two adjacent sides close to the side near sealing part 8 having thin-wall part 9a and thick-wall part 9b.

The manufacturing method of vacuum insulation material 1 of the preferred embodiment relates to configuration including two laminate films 4 each having protective layer 5 on one side, sealant layer 7 on other side, and gas barrier layer 6 between protective layer 5 and sealant layer 7, core material 2 sealed at a reduced pressure between two laminate films 4 disposed so that sealant layers 7 may be opposite to each other, and sealing part 8 having sealant layers 7 fused to each other near the peripheral edge of two laminate films 4 so as to surround the whole circumference of core material 2. Further, in this manufacturing method, at least sealing part 8 at one side of laminate film 4 or sealing part 8 positioned in one direction of core material 2 out of sealing parts 8 surrounding core material 2 is heated and fused as being heated and pressed from outside to two overlapped laminate films 4. At this time, as seen from a section being cut off on a plane perpendicular to the closest peripheral edge, out of the peripheral edge of laminate film 4 (see FIG. 1 or FIG. 3), as going from the closest peripheral edge to the inner circumference of laminate film 4, a pressure is applied from the side of protective layer 5 to the side of sealant layer 7, so that the portion relatively increased in the compression width of laminate film 4 being compressed in a thickness direction on the way may be formed in a plurality of positions, and that the compression width of the portion of laminate film 4 compressed in a thickness direction may be changed continuously. At the same time, it is heated to a temperature for fusing sealant layer 7, but not fusing protective layer 5 and gas barrier layer 6, in a specified range not only in the compressed portion but also near the compressed portion. As a result, a part of the resin for composing sealant layer 7 in a portion of laminate film 4 compressed in a thickness direction is moved to sealant layer 7 in a portion of adjacent laminate film 4 not compressed in a thickness direction. Thereby a plurality of thin-wall parts 9a are formed, in which the thickness of sealant layer 7 between gas barrier layer 6 of laminate film 4 in one part of sealing part 8 is smaller than the total thickness of sealant layers 7 between gas barrier layer 6 of one laminate film 4 other than sealing part 8 and gas barrier layer 6 of other laminate film 4 other than sealing part 8. At the same time, at the inner circumferential side of thin-wall part 9a positioned at the innermost circumferential side out of the plurality of thin-wall parts 9a between two adjacent thin-wall parts 9a out of the plurality of thin-wall parts 9a and at the outer circumferential side of thin-wall part 9a positioned at the outermost circumferential side out of the plurality of thin-wall parts 9a, thick-wall part 9b is formed, in which the thickness of sealant layer 7 between gas barrier layer 6 of one laminate film 4 and gas barrier layers 6 of other laminate film 4 is greater than the total thickness of sealant layers 7 between gas barrier layer 6 of one laminate film 4 other than sealing part 8 and gas barrier layer 6 of other laminate film 4 than sealing part 8. Further, out of the plurality of thin-wall parts 9a, all sealant layers 7 opposite to each other between two adjacent thin-wall parts 9a are heated and fused.

In vacuum insulation material 1 manufactured in this manufacturing method, sealing part 8 having thin-wall part 9a and thick-wall part 9b, when seen from a section being cut off on a plane perpendicular to the closest peripheral edge (see FIG. 1 or FIG. 3), as going from the closest peripheral edge to the inner circumference of the laminate film 4, is pressed from the side of protective layer 5 to the side of heat fusion 7, so as to be changed continuously (smoothly) in the compression width in the portion of laminate film 4 compressed in the thickness direction. At the same time, not only in the portion to be compressed but also near the compressed portion, in a prescribed range, by heating to a temperature so that sealant layer 7 may be fused, but that protective layer 5 and gas barrier layer 6 are not fused, and thereby corners are not formed in each layers 5, 6, 7 for composing laminate film 4. In thin-wall part 9a, too, the thickness of sealant layer 7 can be increased or decreased continuously (smoothly), and outer forces are not concentrated locally in any of the portion of thin-wall part 9a of sealant layer 7, and cracks of gas barrier layer 6 or breakages of sealing part 8 occur very rarely.

Further, when seen from a section being cut off on a plane perpendicular to the closest peripheral edge (see FIG. 1 or FIG. 3), as going from the closest peripheral edge to the inner circumference of laminate film 4, it is pressed from the side of protective layer 5 to the side of sealant layer 7 so as to be changed continuously (smoothly) in the compression width in the portion of laminate film 4 compressed in a thickness direction. At the same time, not only in the portion to be compressed but also near the compressed portion, in a prescribed range, they are heated to a temperature so that sealant layer 7 may be fused, but that protective layer 5 and gas barrier layer 6 are not fused. As a result, the thinnest part of thin-wall part 9a may be narrowed, and as compared with thin-wall part 9a defined in a specific thickness of sealant layer 7 of thin-wall part 9a at one position, it is easier to reduce the thickness of sealant layer 7 of the thinnest part of thin-wall part 9a.

Accordingly, sealing part 8 having thin-wall part 9a and thick-wall part 9b is reduced in the thickness of sealant layer 7 of the thinnest part of thin-wall part 9a, thin-wall parts 9a are provided at plural positions, and the opposite sealant layers 7 between two adjacent thin-wall parts 9a out of the plurality of thin-wall parts 9a are all heated and fused. As a result, the passing area of gas and moisture invading from the end side of the peripheral edge of laminate film 4 is reduced, and the passing resistance of gas and moisture is increased, and the passing speed of gas and moisture is decreased, and thereby the amount of passing gas and moisture is suppressed at gradual time intervals, and an excellent adiabatic performance can be maintained for a long period.

The adhering force of sealing part 8 becomes stronger as the thickness of sealant layer 7 is increased generally along with the thickness of sealant layer 7, and thick-wall parts 9b are formed between two adjacent thin-wall parts 9a, and between the inner circumferential side of thin-wall part 9a positioned at the innermost circumferential side and the outer circumferential side of thin-wall part 9a positioned at the outermost circumferential side, and therefore the thickness of sealant layer 7 is increased or decreased smoothly from the thinnest part of thin-wall part 9a to the thickest part of thick-wall part 9b. In addition, the opposite sealant layers 7 between two adjacent thin-wall parts 9a out of the plurality of thin-wall parts 9a are all heated and fused, and sealing part 8 having thin-wall part 9a is hardly peeled by an external force either from the inner circumferential side or from the outer circumferential side.

In sealing part 8 having thin-wall part 9a and thick-wall part 9b, moreover, thin-wall parts 9a are provided at plural positions, but by increasing and decreasing the thickness of sealant layer 7 continuously (smoothly) also in thin-wall parts 9a, the thinnest part of thin-wall parts 9a is narrowed, and effects of heat bridge can be decreased.

Hence, if thin-wall part 9a reduced in thickness in a part of sealant layer 7 is formed in sealing part 8, in thin-wall part 9a of sealant layer 7 provided in sealing part 8 and in its vicinity, cracks or breakages of sealing part 8 occur very rarely, and moreover the thinnest part of thin-wall part 9a is likely to be thin, and sealing part 8 having thin-wall part 9a is hardly peeled by an external force, and effects of the heat bridge are small, so that vacuum insulation material 1 capable of maintaining the excellent adiabatic performance for a long period can be presented.

Other manufacturing method of vacuum insulation material 1 of the preferred embodiment relates to a configuration including two laminate films 4 each having protective layer 5 on one side, sealant layer 7 on other side, and gas barrier layer 6 between protective layer 5 and sealant layer 7, core material 2 sealed at a reduced pressure between the two laminate films 4 disposed so that sealant layers 7 may be opposite to each other, and sealing part 8 having sealant layers 7 fused to each other near the peripheral edge of the two laminate films 4 so as to surround the whole circumference of core material 2. In this manufacturing method, at least sealing part 8 at one side of laminate films 4 or sealing part 8 positioned in one direction of core material 2 out of the sealing parts 8 surrounding core material 2 is heated and fused as being heated and pressed from outside to two overlapped laminate films 4. At this time, in a direction going from the closest peripheral edge of the peripheral edge of laminate film 4 to the inner circumference of laminate film 4, a pressure is applied from the side of protective layer 5 to the side of sealant layer 7, so that the portion relatively stronger in the pressing force when heating and pressing may be formed at plural positions on the way, and that the pressing force may be changed continuously. At the same time, in a specified range not only in the compressed portion but also near the compressed portion, it is heated to a temperature for fusing sealant layer 7, but not fusing protective layer 5 and gas barrier layer 6. Hence, a part of the resin for composing sealant layer 7 in a portion relatively stronger in the pressing force is moved to sealant layer 7 in a portion relatively weak in pressing force or a portion not pressed being adjacent to the pressed portion. As a result, a plurality of thin-wall parts 9a are formed, in which the thickness of sealant layer 7 between gas barrier layer 6 of laminate film 4 in one part of sealing part 8 is smaller than the total thickness of sealant layers 7 between gas barrier layer 6 of one laminate film 4 other than sealing part 8 and gas barrier layer 6 of other laminate film 4 other than sealing part 8. Moreover, at the same time, at the inner circumferential side of the thin-wall part 9a positioned at the innermost circumferential side out of the plurality of thin-wall parts 9a between two adjacent thin-wall parts 9a out of the plurality of thin-wall parts 9a and at the outer circumferential side of the thin-wall part 9a positioned at the outermost circumferential side out of the plurality of thin-wall parts 9a, a thick-wall part 9b is formed, in which the thickness of sealant layer 7 between gas barrier layer 6 of one laminate film 4 and gas barrier layers 6 of other laminate film 4 is greater than the total thickness of sealant layers 7 between gas barrier layer 6 of one laminate film 4 other than sealing part 8 and gas barrier layer 6 of other laminate film 4 than sealing part 8. Further, out of the plurality of thin-wall parts 9a, all sealant layers 7 opposite to each other between two adjacent thin-wall parts 9a are heated and fused.

In vacuum insulation material 1 manufactured in this manufacturing method, sealing part 8 having thin-wall part 9a and thick-wall part 9b is pressed from the side of protective layer 5 to the side of sealant layer side 7, in a direction going from the closest peripheral edge of the peripheral edge of laminate film 4 to the inner circumference of laminate film 4, so that the portion relatively stronger in the pressing force when heating and pressing may be formed at plural positions on the way, and that the pressing force may be changed continuously (smoothly). At the same time, by heating to a temperature for fusing sealant layer 7, but not fusing protective layer 5 and gas barrier layer 6, in a specified range not only the pressed portion but also near the pressed portion, corners are not formed in layers 5, 6, 7 for composing laminate film 4. Also in thin-wall part 9a, the thickness of sealant layer 7 can be increased or decreased continuously (smoothly), and there is no portion of local concentration of external forces in thin-wall part 9a of sealant layer 7, and cracks of gas barrier layer 6 or breakages of sealing part 8 can occur very rarely.

Further, it is pressed from the side of protective layer 5 to the side of sealant layer 7 so that the pressing force may be changed continuously (smoothly) while the pressing force when heating and pressing may be relatively strong in plural portions on the way, in a direction going from the closest peripheral edge to the inner circumference of laminate film 4. At the same time, not only in the portion to be compressed but also near the compressed portion, in a prescribed range, they are heated to a temperature so that sealant layer 7 may be fused, but that protective layer 5 and gas barrier layer 6 are not fused. As a result, the thinnest part of thin-wall part 9a may be narrowed, and as compared with thin-wall part 9a defined in a specific thickness of sealant layer 7 of thin-wall part 9a at one position, it is easier to reduce the thickness of sealant layer 7 of the thinnest part of thin-wall part 9a.

Accordingly, sealing part 8 having thin-wall part 9a and thick-wall part 9b is reduced in the thickness of sealant layer 7 of the thinnest part of thin-wall part 9a, thin-wall parts 9a are provided at plural positions, and the opposite sealant layers 7 between two adjacent thin-wall parts 9a out of the plurality of thin-wall parts 9a are all heated and fused. As a result, the passing area of gas and moisture invading from the end side of the peripheral edge of laminate film 4 is reduced, and the passing resistance of gas and moisture is increased, and the passing speed of gas and moisture is decreased, and thereby the amount of passing gas and moisture is suppressed at gradual time intervals, and an excellent adiabatic performance can be maintained for a long period.

The adhering force of sealing part 8 becomes stronger as the thickness of sealant layer 7 is increased generally along with the thickness of sealant layer 7, and thick-wall parts 9b are formed between two adjacent thin-wall parts 9a, and between the inner circumferential side of thin-wall part 9a positioned at the innermost circumferential side and the outer circumferential side of thin-wall part 9a positioned at the outermost circumferential side. Therefore the thickness of sealant layer 7 is increased or decreased smoothly from the thinnest part of the thin-wall part 9a to the thickest part of thick-wall part 9b. In addition, the opposite sealant layers 7 between two adjacent thin-wall parts 9a out of the plurality of thin-wall parts 9a are all heated and fused, and sealing part 8 having thin-wall part 9a is hardly peeled by an external force either from the inner circumferential side or from the outer circumferential side.

In sealing part 8 having thin-wall part 9a and thick-wall part 9b, moreover, thin-wall parts 9a are provided at plural positions, but by increasing and decreasing the thickness of sealant layer 7 continuously (smoothly) also in thin-wall parts 9a, the thinnest part of thin-wall parts 9a is narrowed, and effects of heat bridge can be decreased.

Hence, if thin-wall part 9a reduced in thickness in a part of sealant layer 7 is formed in sealing part 8, in thin-wall part 9a of sealant layer 7 provided in sealing part 8 and in its vicinity, cracks or breakages of sealing part 8 occur very rarely, and moreover the thinnest part of thin-wall part 9a is likely to be thin, and sealing part 8 having thin-wall part 9a is hardly peeled by an external force, and effects of the heat bridge are small, so that vacuum insulation material 1 capable of maintaining an excellent adiabatic performance for a long period can be presented.

The manufacturing method of vacuum insulation material 1 of the preferred embodiment relates to configuration including two laminate films 4 of square (rectangular) shape each having protective layer 5 on one side, sealant layer 7 on other side, and gas barrier layer 6 between protective layer 5 and sealant layer 7, being laminated so that sealant layers 7 may be mutually opposite to each other, in which sealant layers 7 near the peripheral edge of three sides of two laminate films 4 are mutually fused, and a bag of laminate films 4 sealed at three sides is manufactured. From the opening part at one remaining side not fused of the bag of laminate films 4, core material 2 is put into the bag of laminate films 4, and the bag of laminate films 4 is evacuated, and sealant layers 7 near the peripheral edge of one remaining side not fused as an opening part of the bag of laminate films 4 are fused and sealed. Sealing of three sides when manufacturing the bag of laminate films 4, sealing of either side of sealing of one remaining side as the opening part of the bag of laminate films 4, or both sealing may be done by heating and fusing by heating and pressing from outside to two laminate films 4. As seen from a section being cut off on a plane perpendicular to the closest peripheral edge, out of the peripheral edge of laminate films 4 (see FIG. 1 or FIG. 3), as going from the closest peripheral edge to the inner circumference of laminate films 4, a pressure is applied from the side of protective layer 5 to the side of sealant layer 7, so that the portion relatively increased in the compression width of laminate films 4 being compressed in a thickness direction on the way may be formed in a plurality of positions, and that the compression width of the portion of laminate films 4 compressed in a thickness direction may be changed continuously. At the same time, it is heated to a temperature for fusing sealant layer 7, but not fusing protective layer 5 and gas barrier layer 6, in a specified range not only in the compressed portion but also near the compressed portion. As a result, a part of the resin for composing sealant layer 7 in a portion of laminate film 4 compressed in a thickness direction is moved to sealant layer 7 in a portion of adjacent laminate film 4 not compressed in a thickness direction. Thereby a plurality of thin-wall parts 9a are formed, in which the thickness of sealant layer 7 between gas barrier layer 6 of laminate film 4 in one part of the sealing part is smaller than the total thickness of sealant layers 7 between gas barrier layer 6 of one laminate film 4 other than the sealing part and gas barrier layer 6 of other laminate film 4 other than the sealing part. At the same time, at the inner circumferential side of thin-wall part 9a positioned at the innermost circumferential side out of the plurality of thin-wall parts 9a between two adjacent thin-wall parts 9a out of the plurality of thin-wall parts 9a and at the outer circumferential side of thin-wall part 9a positioned at the outermost circumferential side out of the plurality of thin-wall parts 9a, thick-wall part 9b is formed, in which the thickness of sealant layer 7 between gas barrier layer 6 of one laminate film 4 and gas barrier layers 6 of other laminate film 4 is greater than the total thickness of sealant layers 7 between gas barrier layer 6 of one laminate film 4 other than the sealing part and gas barrier layer 6 of other laminate film 4 than the sealing part. Further, out of the plurality of thin-wall parts 9a, all sealant layers 7 opposite to each other between two adjacent thin-wall parts 9a are heated and fused.

In vacuum insulation material 1 manufactured in this manufacturing method, sealing part 8 having thin-wall part 9a and thick-wall part 9b, when seen from a section being cut off on a plane perpendicular to the closest peripheral edge (see FIG. 1 or FIG. 3), as going from the closest peripheral edge to the inner circumference of the laminate film 4, is pressed from the side of protective layer 5 to the side of heat fusion 7, so as to be changed continuously (smoothly) in the compression width in the portion of laminate film 4 compressed in a thickness direction. At the same time, not only in the portion to be compressed but also near the compressed portion, in a prescribed range, by heating to a temperature so that sealant layer 7 may be fused, but that protective layer 5 and gas barrier layer 6 are not fused, and thereby corners are not formed in each layers 5, 6, 7 for composing laminate film 4. In thin-wall part 9a, too, the thickness of sealant layer 7 can be increased or decreased continuously (smoothly), and outer forces are not concentrated locally in any of the portion of thin-wall part 9a of sealant layer 7, and cracks of gas barrier layer 6 or breakages of sealing part 8 can occur very rarely.

Further, when seen from a section being cut off on a plane perpendicular to the closest peripheral edge (see FIG. 1 or FIG. 3), as going from the closest peripheral edge to the inner circumference of laminate film 4, it is pressed from the side of protective layer 5 to the side of sealant layer 7 so as to be changed continuously (smoothly) in the compression width in the portion of laminate film 4 compressed in a thickness direction. At the same time, not only in the portion to be compressed but also near the compressed portion, in a prescribed range, they are heated to a temperature so that sealant layer 7 may be fused, but that protective layer 5 and gas barrier layer 6 may not be fused. As a result, the thinnest part of thin-wall part 9a may be narrowed, and as compared with thin-wall part 9a defined in a specific thickness of sealant layer 7 of thin-wall part 9a at one position, it is easier to reduce the thickness of sealant layer 7 of the thinnest part of thin-wall part 9a.

Accordingly, sealing part 8 having thin-wall part 9a and thick-wall part 9b is reduced in the thickness of sealant layer 7 of the thinnest part of thin-wall part 9a, thin-wall parts 9a are provided at plural positions, and the opposite sealant layers 7 between two adjacent thin-wall parts 9a out of the plurality of thin-wall parts 9a are all heated and fused. As a result, the passing area of gas and moisture invading from the end side of the peripheral edge of laminate film 4 is reduced, and the passing resistance of gas and moisture is increased, and the passing speed of gas and moisture is decreased, and thereby the amount of passing gas and moisture is suppressed at gradual time intervals, and an excellent adiabatic performance can be maintained for a long period.

The adhering force of sealing part 8 becomes stronger as the thickness of sealant layer 7 is increased generally along with the thickness of sealant layer 7, and thick-wall parts 9b are formed between two adjacent thin-wall parts 9a, and between the inner circumferential side of thin-wall part 9a positioned at the innermost circumferential side and the outer circumferential side of thin-wall part 9a positioned at the outermost circumferential side, and therefore the thickness of sealant layer 7 is increased or decreased smoothly from the thinnest part of thin-wall part 9a to the thickest part of thick-wall part 9b. In addition, the opposite sealant layers 7 between two adjacent thin-wall parts 9a out of the plurality of thin-wall parts 9a are all heated and fused, and sealing part 8 having thin-wall part 9a is hardly peeled off by an external force either from the inner circumferential side or from the outer circumferential side.

In sealing part 8 having thin-wall part 9a and thick-wall part 9b, moreover, thin-wall parts 9a are provided at plural positions, but by increasing and decreasing the thickness of sealant layer 7 continuously (smoothly) also in thin-wall parts 9a, the thinnest part of thin-wall parts 9a is narrowed, and effects of heat bridge can be decreased.

Hence, if thin-wall part 9a reduced in thickness in a part of sealant layer 7 is formed in sealing part 8, in thin-wall part 9a of sealant layer 7 provided in sealing part 8 and in its vicinity, cracks or breakages of sealing part 8 occur very rarely. Moreover the thinnest part of thin-wall part 9a is likely to be thin, and sealing part 8 having thin-wall part 9a is hardly peeled off by an external force, and effects of the heat bridge are small, so that vacuum insulation material 1 capable of maintaining an excellent adiabatic performance for a long period can be presented.

Sealing part 8 having thin-wall part 9a and thick-wall part 9b is preferred to be formed in an example as shown in FIG. 5, in which when manufacturing the bag of laminate films 4, sealing of three sides and sealing of one remaining side as the opening part of the bag of laminate films 4 should be both executed, so that an excellent adiabatic performance may be maintained for a longer period.

Since sealing of one remaining side as the opening part of the bag of laminate films 4 should be performed in an evacuated state of the bag of laminate films 4, sealing is often carried out in a reduced pressure space, and there is a stronger restriction than in sealing of three sides when manufacturing the bag of laminate films 4 conducted in an atmospheric environment. Accordingly, sealing of one remaining side as the opening part of the bag of laminate films 4 carried out in a conventional known method, sealing of three sides when manufacturing the bag of laminate films 4 conducted in an atmospheric environment is carried out to form sealing part 8 having thin-wall part 9a and thick-wall part 9b. As a result, the adiabatic performance can be enhanced in consideration of the working efficiency, the manufacturing cost, and the sealing facility.

Other manufacturing method of vacuum insulation material 1 of the preferred embodiment relates to a configuration including two laminate films 4 of square (rectangular shape) each having protective layer 5 on one side, sealant layer 7 on other side, and gas barrier layer 6 between protective layer 5 and sealant layer 7, being laminated so that sealant layers 7 may be mutually opposite to each other, in which sealant layers 7 near the peripheral edge of three sides of two laminate films 4 are mutually fused, and a bag of laminate films 4 sealed at three sides is manufactured. From the opening part at one remaining side not fused of the bag of laminate films 4, core material 2 is put into the bag of laminate films 4, and the bag of laminate films 4 is evacuated, and sealant layers 7 near the peripheral edge of one remaining side not fused as an opening part of the bag of laminate films 4 are mutually fused and sealed. Sealing of three sides when manufacturing the bag of laminate films 4, sealing of either side of sealing of one remaining side as the opening part of the bag of laminate films 4, or both sealing may be done by heating and fusing by heating and pressing from outside to two laminate films 4. In a direction from the closest peripheral edge of the peripheral edge of laminate films 4 to the inner circumference of laminate films 4, a pressure is applied from the side of protective layer 5 to the side of sealant layer 7, so that the portion relatively increased in the pressing force in the heating and pressing process may be formed in a plurality of positions and that the pressing force may be changed continuously. At the same time, it is heated to a temperature for fusing sealant layer 7, but not fusing protective layer 5 and gas barrier layer 6, in a specified range not only in the compressed portion but also near the compressed portion. As a result, a part of the resin for composing sealant layer 7 in a portion relatively stronger in the pressing force is moved to sealant layer 7 in a portion relatively weak in pressing force or a portion not pressed being adjacent to the pressed portion. Thereby a plurality of thin-wall parts 9a are formed, in which the thickness of sealant layer 7 between gas barrier layer 6 of laminate film 4 in one part of the sealing part gas barrier layer 6 of laminate film 4 of other part than sealing part is smaller than the total thickness of sealant layers 7 between gas barrier layer 6 of one laminate film 4 other than the sealing part and gas barrier layer 6 of other laminate film 4 other than the sealing part. At the same time, at the inner circumferential side of thin-wall part 9a positioned at the innermost circumferential side out of the plurality of thin-wall parts 9a between two adjacent thin-wall parts 9a out of the plurality of thin-wall parts 9a and at the outer circumferential side of thin-wall part 9a positioned at the outermost circumferential side out of the plurality of thin-wall parts 9a, thick-wall part 9b is formed, in which the thickness of sealant layer 7 between gas barrier layer 6 of one laminate film 4 and gas barrier layers 6 of other laminate film 4 is greater than the total thickness of sealant layers 7 between gas barrier layer 6 of one laminate film 4 other than sealing part 8 and gas barrier layer 6 of other laminate film 4 than sealing part 8. Further, out of the plurality of thin-wall parts 9a, all sealant layers 7 opposite to each other between two adjacent thin-wall parts 9a are heated and fused.

In vacuum insulation material 1 manufactured in this manufacturing method, sealing part 8 having thin-wall part 9a and thick-wall part 9b is pressed from the side of protective layer 5 to the side of sealant layer side 7, in a direction going from the closest peripheral edge to the inner circumference of laminate film 4, so that the portion relatively stronger in the pressing force when heating and pressing may be formed at plural positions on the way, and that the pressing force may be changed continuously (smoothly). At the same time, the material is heated to a temperature for fusing sealant layer 7, but not fusing protective layer 5 and gas barrier layer 6, in a specified range not only the pressed portion but also near the pressed portion. As a result, corners are not formed in layers 5, 6, 7 for composing laminate film 4. Also in thin-wall part 9a, the thickness of sealant layer 7 can be increased or decreased continuously (smoothly), and there is no portion of local concentration of external forces in thin-wall part 9a of sealant layer 7, and cracks of gas barrier layer 6 or breakages of sealing part 8 can occur very rarely.

Further, it is pressed from the side of protective layer 5 to the side of sealant layer 7 so that the pressing force may be changed continuously (smoothly) while the pressing force when heating and pressing may be relatively strong in plural portions on the way, in a direction going from the closest peripheral edge to the inner circumference of laminate film 4. At the same time, not only in the portion to be compressed but also near the compressed portion, in a prescribed range, they are heated to a temperature so that sealant layer 7 may be fused, but that protective layer 5 and gas barrier layer 6 are not fused. As a result, the thinnest part of thin-wall part 9a may be narrowed, and as compared with thin-wall part 9a defined in a specific thickness of sealant layer 7 of thin-wall part 9a at one position, it is easier to reduce the thickness of sealant layer 7 of the thinnest part of thin-wall part 9a.

Accordingly, sealing part 8 having thin-wall part 9a and thick-wall part 9b is reduced in the thickness of sealant layer 7 of the thinnest part of thin-wall part 9a, thin-wall parts 9a are provided at plural positions, and the opposite sealant layers 7 between two adjacent thin-wall parts 9a out of the plurality of thin-wall parts 9a are all heated and fused. As a result, the passing area of gas and moisture invading from the end side of the peripheral edge of laminate film 4 is reduced, the passing resistance of gas and moisture is increased, and the passing speed of gas and moisture is decreased, and thereby the amount of passing gas and moisture is suppressed at gradual time intervals, and an excellent adiabatic performance can be maintained for a long period.

The adhering force of sealing part 8 becomes stronger as the thickness of sealant layer 7 is increased generally along with the thickness of sealant layer 7, and thick-wall parts 9b are formed between two adjacent thin-wall parts 9a, and between the inner circumferential side of thin-wall part 9a positioned at the innermost circumferential side and the outer circumferential side of thin-wall part 9a positioned at the outermost circumferential side, and therefore the thickness of sealant layer 7 is increased or decreased smoothly from the thinnest part of the thin-wall part 9a to the thickest part of thick-wall part 9b. In addition, the opposite sealant layers 7 between two adjacent thin-wall parts 9a out of the plurality of thin-wall parts 9a are all heated and fused. As a result, sealing part 8 having thin-wall part 9a is hardly peeled by an external force either from the inner circumferential side or from the outer circumferential side.

In sealing part 8 having thin-wall part 9a and thick-wall part 9b, moreover, thin-wall parts 9a are provided at plural positions, but by increasing and decreasing the thickness of sealant layer 7 continuously (smoothly) also in thin-wall parts 9a, the thinnest part of thin-wall parts 9a is narrowed, and effects of heat bridge can be decreased.

Hence, if thin-wall part 9a reduced in thickness in a part of sealant layer 7 is formed in sealing part 8, in thin-wall part 9a of sealant layer 7 provided in sealing part 8 and in its vicinity, cracks or breakages of sealing part 8 occur very rarely. Moreover the thinnest part of thin-wall part 9a is likely to be thin, and sealing part 8 having thin-wall part 9a is hardly peeled by an external force, and effects of the heat bridge are small, so that vacuum insulation material 1 capable of maintaining an excellent adiabatic performance for a long period can be presented.

Sealing part 8 having thin-wall part 9a and thick-wall part 9b is preferred to be formed by both sealing of three sides and sealing of one remaining side as the opening part of the bag of laminate films 4 when manufacturing the bag of laminate films 4, so that an excellent adiabatic performance may be maintained for a longer period.

Since sealing of one remaining side as the opening part of the bag of laminate films 4 should be performed in an evacuated state of the bag of laminate films 4, sealing is often carried out in a reduced pressure space, and there is a stronger restriction than in sealing of three sides when manufacturing the bag of laminate films 4 conducted in an atmospheric environment. Accordingly, sealing of one remaining side as the opening part of the bag of laminate films 4 is carried out in a conventional known method, sealing of three sides when manufacturing the bag of laminate films 4 conducted in an atmospheric environment is carried out to form sealing part 8 having thin-wall part 9a and thick-wall part 9b. As a result, the adiabatic performance can be enhanced in consideration of the working efficiency, the manufacturing cost, and the sealing facility.

The manufacturing method of vacuum insulation material 1 of the preferred embodiment shown in FIG. 2 is to heat and fuse so as to form thin-wall part 9a and thick-wall part 9b only when sealing the three sides in the case of manufacture of the bag of laminate films 4.

Since sealing of one remaining side as the opening part of the bag of laminate films 4 should be performed in an evacuated state of the bag of laminate films 4, sealing is often carried out in a reduced pressure space, and there is a stronger restriction than in sealing of three sides when manufacturing the bag of laminate films 4 conducted in an atmospheric environment. Accordingly, sealing of one remaining side as the opening part of the bag of laminate films 4 is carried out in a conventional known method, sealing of three sides when manufacturing the bag of laminate films 4 conducted in an atmospheric environment is carried out to form sealing part 8 having thin-wall part 9a and thick-wall part 9b, and therefore, the adiabatic performance can be enhanced in consideration of the working efficiency, the manufacturing cost, and the sealing facility.

In another manufacturing method of vacuum insulation material 1 of the preferred embodiment, thin-wall part 9a is formed to be linked from one peripheral edge to other peripheral edge out of two adjacent peripheral edges close to the peripheral edge near the portion for heating and fusing to form thin-wall part 9a and thick-wall part 9b. Considering fluctuations in the sealing position in the sealing work, the sealing reliability is higher when thin-wall part 9a is linked from one peripheral edge to other peripheral edge out of two adjacent peripheral edges close to the portion near the heated and fused portion having thin-wall part 9a and thick-wall part 9b.

In the manufacturing method of vacuum insulation material 1 of the preferred embodiment, when heating and fusing to form thin-wall part 9a and thick-wall part 9b, a heating and compressing jig is used, that is, upper side heating and compressing jig 10 heated to a temperature enough to fuse sealant layer 7, but not fusing protective layer 5 and gas barrier layer 6 is used for heating and pressing. Upper side heating and compressing jig 10 has a plurality of protrusions 11 projecting parallel at mutual specified intervals for pressing laminate films 4 from the side of protective layer 5 to the side of sealant layer 7, and has a smooth curved surface contacting with laminate films 4 at the time of pressing in protrusions 11 and the projecting height of protrusions 11 is more than the difference of the thickness of the thickest part of thick-wall part 9b and the thickness of the thinnest part of thin-wall part 9a. It is configured to heat laminate film 4 without making contact in a specified range, in the portion positioned between two adjacent protrusions 11 out of the plurality of protrusions 11 and near the contacting portion with laminate films 4 at the time of pressing. By using upper side heating and compressing jig 10 heated to the specified temperature, by heating and pressing the portion of laminate films 4 to be heated and fused, the material can be heated and fused easily so that thick-wall part 9b and think-wall part 9b may be formed.

Herein, since the side contacting with laminate film 4 when pressing in protrusions 11 is a smooth surface, and when pressing laminate film 4 by protrusions 11, laminate films 4 are hardly injured, and after heating and pressing, the interval is changed continuously between gas barrier layer 6 of one laminate film 4 in sealing part 8 and gas barrier layer 6 of other laminate film 4 of sealing part 8. Of the plurality of protrusions 11, the portion positioned between two adjacent protrusions 11, and the portion near the contacting portion with laminate film 4 at the time of pressing are configured to heat laminate films 4 without making contact in a specified range. As a result, as far as having means for heating upper side heating and compressing jig 10 to a specified high temperature, no particular means is needed for heating the vicinity of the portion compressed by protrusions 11 in laminate films 4 in a specified range.

In the manufacturing method of vacuum insulation material 1 of the preferred embodiment, protrusions 11 of upper side heating and compressing jig 10 as the heating and compressing jig are designed to be increased in the decrement width of the projecting amount as gradually departing from the most projecting portion, in a section (see FIG. 4) of the leading end portion of protrusions 11 when cut off along a plane parallel to an arranging direction of a plurality of protrusions 11 parallel to the projecting direction of protrusions 11.

By heating and pressing the portion to be heated and fused of laminate film 4, using upper side heating and compressing jig 10 having the above configuration being heated to a prescribed temperature, it is easy to move a part of the resin for composing sealant layer 7 in the portion of laminate film 4 compressed in a thickness direction to sealant layer 7 in the portion of adjacent laminate film 4 not compressed in a thickness direction. In other words, it is easy to move a part of the resin for composing sealant layer 7 in the portion relatively strong in pressing force to a portion relative weak in pressing force or to sealant layer 7 in the portion not pressed being adjacent to the pressed portion, and it is easy to reduce the thickness of the thinnest part of thin-wall part 9a. Moreover, as the thinnest part of thin-wall part 9a becomes thinner, the passing area of gas and moisture invading from the end side of the peripheral edge of laminate film 4 is reduced, the passing resistance of gas and moisture is increased, and the passing speed of gas and moisture is decreased, and thereby the amount of passing gas and moisture is suppressed at gradual time intervals, and an excellent adiabatic performance can be maintained for a long period.

In a section (see FIG. 4) of the leading end portion of protrusions 11 when cut off along a plane parallel to an arranging direction of a plurality of protrusions 11 parallel to the projecting direction of protrusions 11, in protrusions 11 of upper side heating and compressing jig 10 composed of a smooth curved surface on a surface contacting with laminate film 4 when compressed in protrusions 11, the decrement width of the projecting amount is increased as gradually departing from the most projecting portion. As a result, at the time of heating and pressing, external forces are not concentrated locally, and cracks of gas barrier layer 6 and breakages of sealing part 8 can occur very hardly.

Further, by narrowing the width of the most projecting portion of protrusions 11, the thinnest part of thin-wall part 9a is narrowed, and effects of heat bridge can be decreased.

In the manufacturing method of vacuum insulation material 1 of the preferred embodiment, a section (see FIG. 4) of the leading end portion of protrusions 11 when cut off along a plane parallel to an arranging direction of a plurality of protrusions 11 parallel to the projecting direction of protrusions 11, in protrusions 11 of upper side heating and compressing jig 10 as heating and compressing jig is a convex arc shape in the projecting direction (including a nearly arc shape).

When the portion to be heated and fused of laminate film 4 is heated and pressed by using upper side heating and compressing jig 10 having the above configuration being heated to a prescribed temperature, as the portion near the thinnest portion of the thickness of sealant layer 7 in thin-wall part 9a approaches the thinnest portion of the thickness of sealant layer 7, the decrement width of the thickness of sealant layer 7 becomes smaller, and it is easy to move a part of the resin for composing sealant layer 7 in the portion of laminate film 4 compressed in a thickness direction to sealant layer 7 in the portion of adjacent laminate film 4 not compressed in a thickness direction. In other words, it is easy to move a part of the resin for composing sealant layer 7 in the portion relatively strong in pressing force to a portion relative weak in pressing force or to sealant layer 7 in the portion not pressed being adjacent to the pressed portion, and it is easy to reduce the thickness of the thinnest part of thin-wall part 9a. Moreover, as the thinnest part of thin-wall part 9a becomes thinner, the passing area of gas and moisture invading from the end side of the peripheral edge of laminate film 4 is reduced, the passing resistance of gas and moisture is increased, and the passing speed of gas and moisture is decreased, and thereby the amount of passing gas and moisture is suppressed at gradual time intervals, and an excellent adiabatic performance can be maintained for a long period.

Meanwhile, when a section (see FIG. 4) of the leading end portion of protrusions 11 being cut off along a plane parallel to an arranging direction of a plurality of protrusions 11 parallel to the projecting direction of protrusions 11, in protrusions 11 of upper side heating and compressing jig 10 is a convex arc shape in the projecting direction (including a nearly arc shape), the change is smooth in the interval between gas barrier layer 6 of one laminate film 4 of sealing part 8 having thin-wall part 9a and thick-wall part 9b and gas barrier layer 6 of other laminate film 4. As a result, external forces are not concentrated locally, and cracks of gas barrier layer 6 and breakages of sealing part 8 can occur very hardly. At the same time, the thinnest part of thin-wall part 9a is narrower, and effects of heat bridges may be decreased.

In the manufacturing method of vacuum insulation material 1 of the preferred embodiment, when heating and fusing to form thin-wall part 9a and thick-wall part 9b, by using a flat planar heating element having a heating surface free from external forces, elastically deformable on the heating surface (lower side heating and compressing jig 13 having silicone rubber sheet 12 on a pressing surface), aside from upper side heating and compressing jig 10 as the heating and compressing jig, laminate film 4 is held between upper side heating and compressing jig 10 and the planar heating element, and is heated and pressed.

In vacuum insulation material 1 manufactured in this manufacturing method, in sealing part 8 having thin-wall part 9a and thick-wall part 9b, the convexo-concave shape of the surface of one laminate film 4 is different from the convexo-concave shape of the surface of other laminate film 4, and in thin-wall part 9a, the surface of one laminate film 4 is concaved to the side of heat insulation layer 7 in the portion corresponding to the thinnest portion of thin-wall part 9a, and the surface of other laminate film 4 is not concaved to the side of heat insulation layer 7 in the portion corresponding to the thinnest portion of thin-wall part 9a, and thus vacuum insulation material 1 formed. In this vacuum insulation material 1, laminate film 4 smaller in bulging of the convexo-concave shape of the surface of laminate film 4 compensates for deterioration of strength of laminate film 4 larger in bulging of the convexo-concave shape of the surface of laminate film 4, and thereby cracks of gas barrier layer 6 and breakages of sealing part 8 can occur very hardly.

When heating and pressing laminate film 4 by holding with two heating and compressing jigs 10, a high precision is demanded in positioning of two heating and compressing jigs 10, and it is required to prevent deviation of positioning of two heating and compressing jigs 10. However, when heating and pressing laminate film 4 by holding with upper side heating and compressing jig 10 having the above configuration and the planar heating element, any particular high precision is not needed in positioning as compared with the case of heating and pressing of laminate film 4 by holding with two heating and compressing jigs 10.

Moreover, in the case of heating and pressing of laminate film 4 by holding with upper side heating and compressing jig 10 and the planar heating element, upper side heating and compressing jig 10 may be made of a metal material, and a rubber sheet heater may be used for the planar heating element. If the heating temperature from the planar heating element is lower than the heating temperature from upper side heating and compressing jig 10, laminate film 4 can be heated and fused unless the heating temperature from the planar heating element is too low. Or, in the case of pressing by upper side heating and compressing jig 10 from above by putting laminate film 4 on the planar heating element, if there are slight fluctuations in the moving width in a downward direction of upper side heating and compressing jig 10 at the time of pressing, fluctuations can be absorbed by the elastic deformation of the planar heating element, and fluctuations of the quality of vacuum insulation material 1 can be minimized.

Further, in the case of heating and pressing of laminate film 4 by holding with upper side heating and compressing jig 10 and the planar heating element, as compared with the case of heating and pressing of laminate film 4 by holding with two heating and compressing jigs 10, along with the progress of pressing, the increasing rate of the contacting area between protrusions 11 of heating and compressing jig 10 and laminate film 4 may be increased. As a result, external forces are likely to be dispersed, and damaging of laminate film 4 may be decreased, and it is smooth to change in the interval between gas barrier layer 6 of one laminate film 4 of sealing part 8 having thin-wall part 9a and thick-wall part 9b, and gas barrier layer 6 of other laminate film 4, and it is easy to form thin-wall part 9a and thick-wall part 9b.

Also, in the case of heating and pressing of laminate film 4 by holding with upper side heating and compressing jig 10 and the planar heating element, along with the progress of pressing by upper side heating and compressing jig 10, due to stress from the planar heating element, laminate film 4 in a portion not contacting with protrusions 11 of upper side heating and compressing jig 10 comes closer to upper side heating and compressing jig 10. As a result, it is easier to heat laminate film 4, without making contact therewith, near the portion positioned between two adjacent protrusions 11 of the plurality of protrusions 11 in upper side heating and compressing jig 10, and the contacting portion with laminate film 4 at the time of pressing.

In the manufacturing method of vacuum insulation material 1 of the preferred embodiment, upper side heating and compressing jig 10, as the heating and compressing jig, is preferred to have the length of the projecting portions of the plurality of protrusions 11, being longer than the length of the peripheral edge approaching the portion of heating and fusing for forming thin-wall part 9a and thick-wall part 9b. As a result, if there are slight fluctuations in the sealing position in the sealing work, it is highly possible to manufacture vacuum insulation material 1 in which thin-wall part 9a is linked from one side to other side of two sides adjacent to the side approaching sealing part 8 having thin-wall part 9a and thick-wall part 9b.

Considering fluctuations in the sealing position in the sealing work, the reliability is higher in vacuum insulation material 1 in which thin-wall part 9a is linked from one side to other side of two sides adjacent to the side approaching sealing part 8 having thin-wall part 9a and thick-wall part 9b, than in other vacuum insulation material not linked from one side to other side.

INDUSTRIAL APPLICABILITY

The vacuum insulation material of the present invention has an adiabatic performance capable of withstanding a long-term use, and is preferably used in insulating materials of refrigerator or automatic vending machine, insulating materials for building and structure, insulating materials for automobile, cold storage box, and many others.

The invention claimed is:

1. A vacuum insulation material comprising:
    first and second laminate films each having a protective layer on a first side, a sealant layer on a second side, and a gas barrier layer between the protective layer and the sealant layer;
    a core material sealed under a reduced pressure between the first and second laminate films disposed so that the sealant layers of the laminate films are opposite to each other; and
    a sealing part having the sealant layers of the first and second laminate films fused to each other near the peripheral edge of the laminate films so as to surround a whole circumference of the core material,
    wherein at least at the sealing part positioned at one side of the laminate film or at the sealing part positioned at one side of the core material out of the sealing parts surrounding the core material, the sealing part is changed continuously, when seen from a section in a plane perpendicular to the laminate films, in a direction from an outermost peripheral edge to an inner periphery of the laminate films, in a portion that changes in the interval between the gas barrier layers of the first and second laminate films, there are a plurality of thin-wall parts in which a thickness of the sealant layer between the gas barrier layers is smaller than a total thickness of the thickness of the sealant layers between the gas barrier layers of the laminate films not heated and fused,
    between the two adjacent thin-wall parts out of the plurality of the thin-wall parts, at the inner circumferential side of the thin-wall part positioned at the inner most circumferential side out of the plurality of thin-wall parts and at the outermost circumferential side of the thin-wall part out of the plurality of the thin-wall parts positioned at the outermost circumferential side, there are a plurality of thick-wall parts in which the thickness of the sealant layer between the gas barrier layers of the first and second laminate films is greater than the total thickness of the sealant layers between the gas barrier layers of the laminate films not heated and fused,
    the first and second laminate films have a convexo-concave shape on surfaces thereof,
    wherein a convexo-concave shape of the surface of the first laminate film is different from a convexo-concave shape of the surface of the second laminate film,
    the sealing part comprises the thin-wall part and the thick-wall part, and of the plurality of thin-wall parts, all sealant layers opposite to each other between two adjacent thin-wall parts are heated and fused, where the thin-wall part is provided at a deepest position of a concave part at a boundary of the sealant layer and the gas barrier layer in the sealing part.

2. The vacuum insulation material according to claim 1, wherein in the thin-walled part, in the vicinity of a thinnest portion of the sealant layer, the a decremental thickness of the sealant layer becomes less as the thickness of the sealant layer approaches the thinnest portion.

3. The vacuum insulation material according to claim 2, wherein when seen from a section being cut off from a plane perpendicular to the closest peripheral edge, in the thin-wall part, a surface of one of the laminate films is concaved in an arc extending to the side of the sealant layer in the portion corresponding to the thinnest portion of the thin-wall part.

4. The vacuum insulation material according to claim 1, wherein the thin-wall part is concaved to a side of the sealant layer in the portion corresponding to a thinnest portion of the thin-wall part on the surface of the first laminate film, and is not concaved to a side of the sealant layer in the portion corresponding to the thinnest portion of the thin-wall part on the surface of the second laminate film.

5. The vacuum insulation material according to claim 1, wherein a metal foil is included in the gas barrier layer of the laminate film in either one of the first and second laminate films that is smaller in a bulging height of the surface convexo-concave shape.

6. The vacuum insulation material according to claim 1, wherein a metal evaporation layer is included in the gas barrier layer of the laminate film in either one of the first and second laminate films that is larger in a bulging height of a surface convexo-concave shape.

7. The vacuum insulation material according to claim 1, wherein a metal foil is included in the gas barrier layer of at least one laminate film out of the first and second laminate films.

8. The vacuum insulation material according to claim 1, wherein a metal evaporation layer is included in the gas barrier layer of at least one laminate film out of the first and second laminate films.

9. The vacuum insulation material according to claim 1, wherein a metal foil is included in the gas barrier layer of at least one laminate film out of the first and second laminate films, and a metal evaporation layer is used in the gas barrier layer of the other laminate film.

10. The vacuum insulation material according to claim 1, wherein the thin-wall part and the thick-wall part are provided in the sealing part on remaining sides except for one side of the laminate films of the sealing part surrounding the core material.

11. The vacuum insulation material according to claim 1, wherein the thin-wall part and the thick-wall part are provided in a remaining sealing part except for a sealing part positioned in one direction of the core material of the sealing part surrounding the core material.

12. The vacuum insulation material according to claim 1, wherein the sealing part having the thin-wall part and the thick-wall part surrounds the whole circumference of the core material.

13. The vacuum insulation material according to claim 12, wherein the whole circumference of the core material is surrounded by a linked thin-wall part.

14. The vacuum insulation material according to claim 1, wherein the laminate films comprise square-shaped films, and the sealing part having the thin-wall part and the thick-wall part is provided near the peripheral edge of three sides of the laminate films, and is surrounded by the thin-wall part linked on three sides of the core material.

15. The vacuum insulation material according to claim 14, wherein the thin-wall part is linked from one side to other side of two sides adjacent to the side close to the sealing part having the thin-wall part and the thick-wall part.

16. The vacuum insulation material according to claim 1, wherein the laminate films comprise polygonal-shaped films having three or more angles, and the thin-wall part is linked between two sides adjacent to a side close to the sealing part having the thin-wall part and the thick-wall part.

17. The vacuum insulation material of claim 1, wherein a deepest part of the sealant layer at a side of a boundary between the sealant layer and the gas barrier layer of the first laminate film is not opposite to a deepest part in the concave portion at a side of a boundary between the sealant layer and the gas barrier layer of the second laminate film of the sealant layer.

* * * * *